(12) United States Patent
Shinomiya et al.

(10) Patent No.: US 11,892,671 B2
(45) Date of Patent: Feb. 6, 2024

(54) LIGHT-EMITTING MODULE AND PLANAR LIGHT SOURCE

(71) Applicant: NICHIA CORPORATION, Anan (JP)

(72) Inventors: Yasunori Shinomiya, Tokushima (JP); Atsushi Kanda, Tokushima (JP); Masato Okuda, Itano-gun (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/062,890

(22) Filed: Dec. 7, 2022

(65) Prior Publication Data

US 2023/0176272 A1    Jun. 8, 2023

(30) Foreign Application Priority Data

Dec. 8, 2021 (JP) ................... 2021-199398
Dec. 23, 2021 (JP) ................... 2021-209002
Mar. 29, 2022 (JP) ................... 2022-053681
Jun. 29, 2022 (JP) ................... 2022-104251

(51) Int. Cl.
  *F21V 8/00* (2006.01)
(52) U.S. Cl.
  CPC .......... *G02B 6/0021* (2013.01); *G02B 6/0031* (2013.01); *G02B 6/0068* (2013.01)
(58) Field of Classification Search
  CPC ... G02B 6/0021; G02B 6/0031; G02B 6/0068
  See application file for complete search history.

(56) References Cited

U.S. PATENT DOCUMENTS

| | | |
|---|---|---|
| 2007/0147073 A1 | 6/2007 | Sakai et al. |
| 2009/0003002 A1 | 1/2009 | Sato |
| 2011/0018012 A1 | 1/2011 | Tanaka et al. |
| 2014/0133180 A1 | 5/2014 | Sakai |
| 2019/0094618 A1 | 3/2019 | Kyoukane et al. |
| 2021/0191031 A1 | 6/2021 | Daikoku |
| 2021/0247051 A1 | 8/2021 | Nakabayashi et al. |

FOREIGN PATENT DOCUMENTS

| | | | | |
|---|---|---|---|---|
| CN | 101329472 A | * | 12/2008 | |
| CN | 101652686 A | * | 2/2010 | ........... G02B 6/0021 |
| CN | 107505769 A | * | 12/2017 | ........... G02B 6/0003 |
| CN | 111208670 A | * | 5/2020 | ........... G02B 6/0021 |
| CN | 115185125 A | * | 10/2022 | |
| JP | 2007188863 A | | 7/2007 | |

(Continued)

*Primary Examiner* — Mary Ellen Bowman
(74) *Attorney, Agent, or Firm* — Hunton Andrews Kurth LLP

(57) ABSTRACT

A light-emitting module includes a light guide member including a first surface, a second surface on an opposite side of the first surface, and a first through hole penetrating from the first surface to the second surface, a light source unit disposed in the first through hole, a first light-transmissive member disposed in the first through hole of the light guide member and covering the light source unit, and a reflective member disposed above the light source unit and disposed above the first light-transmissive member. In a plan view, an outer edge of the reflective member is located outside an outer edge of the light source unit, and the reflective member includes a resin member and a reflector having a refractive index lower than a refractive index of the resin member.

20 Claims, 26 Drawing Sheets

(56) References Cited

FOREIGN PATENT DOCUMENTS

| | | | |
|---|---|---|---|
| JP | 2009231128 | A | 10/2009 |
| JP | 2010003941 | A | 1/2010 |
| JP | 2011258581 | A | 12/2011 |
| JP | 2013145765 | A | 7/2013 |
| JP | 2019061929 | A | 4/2019 |
| JP | 2021100090 | A | 7/2021 |
| JP | 2021125455 | A | 8/2021 |
| JP | 2021131928 | A | 9/2021 |
| JP | 2021136119 | A | 9/2021 |
| WO | 2020101038 | A1 | 5/2020 |

\* cited by examiner ional No. 2022-104251 filed on Jun. 29, 2022, the
LIGHT-EMITTING MODULE AND PLANAR LIGHT SOURCE

CROSS-REFERENCE TO RELATED APPLICATION

This application claims priority to Japanese Patent Application No. 2021-199398 filed on Dec. 8, 2021, No. 2021-209002 filed on Dec. 23, 2021, No. 2022-053681 filed on Mar. 29, 2022, No. 2022-104251 filed on Jun. 29, 2022, the disclosures of which are hereby incorporated by reference in their entirety.

BACKGROUND

A light-emitting module acquired by combining a light-emitting element such as a light-emitting diode with a light guide member is widely used in, for example, a planar light source such as a backlight for a liquid crystal display. For example, Japanese Patent Application Publication No. 2019-61929 A describes a backlight device including an LED substrate provided with a reflective sheet and a plurality of light-emitting diodes, and a diffusion plate facing the LED substrate.

SUMMARY

One object of an exemplary embodiment according to the present disclosure is to provide a light-emitting module and a planar light source that can reduce luminance unevenness.

According to an exemplary aspect of the present disclosure, a light-emitting module includes a light guide member including a first surface, a second surface on an opposite side of the first surface, and a first through hole penetrating from the first surface to the second surface, a light source unit disposed in the first through hole of the light guide member, a first light-transmissive member disposed in the first through hole of the light guide member and covering the light source unit, and a reflective member disposed above the light source unit and disposed above the first light-transmissive member. In a plan view, an outer edge of the reflective member is located outside an outer edge of the light source unit, and the reflective member includes a resin member and a reflector having a refractive index lower than a refractive index of the resin member.

A light-emitting module and a planar light source according to an exemplary embodiment of the present invention can reduce luminance unevenness.

DETAILED DESCRIPTION

Embodiments will be described below with reference to the drawings. Note that the drawings are diagrams that schematically illustrate the embodiments, and thus scales, intervals, positional relationships, or the like of members may be exaggerated, or illustration of some of the members may not be omitted. The schematic plan views illustrating a planar light source illustrated in FIG. 1 and the like are drawings of the planar light source viewed from above. In the present specification, a direction of an arrow on a Z axis is defined as upward and a direction opposite to the direction of the arrow on the Z axis is defined as downward. As a cross-sectional view, an end surface illustrating only a cut surface may be illustrated.

In the following description, components having substantially the same function may be denoted by the same reference signs and a description thereof may be omitted. Further, terms indicating a specific direction or position ("upper", "lower", and other terms related to these terms) may be used. However, these terms are used merely to make it easy to understand relative directions or positions in the referenced drawing. As long as the relative direction or position is the same as that described in the referenced drawing using the term such as "upper" or "lower", in drawings other than the drawings of the present disclosure, actual products, and the like, components need not necessarily be arranged in the same manner as in the referenced drawing. In the present specification, "parallel" includes not only a case in which two straight lines, sides, surfaces, or the like do not intersect even if extended, but also a case in which angles formed by two straight lines, sides, surfaces, or the like intersect in a range of 10° or less. In the present specification, a positional relationship that expresses "up" includes a case in which an object is in contact and also a case in which an object is not in contact but located above.

Embodiments

Figure 1:
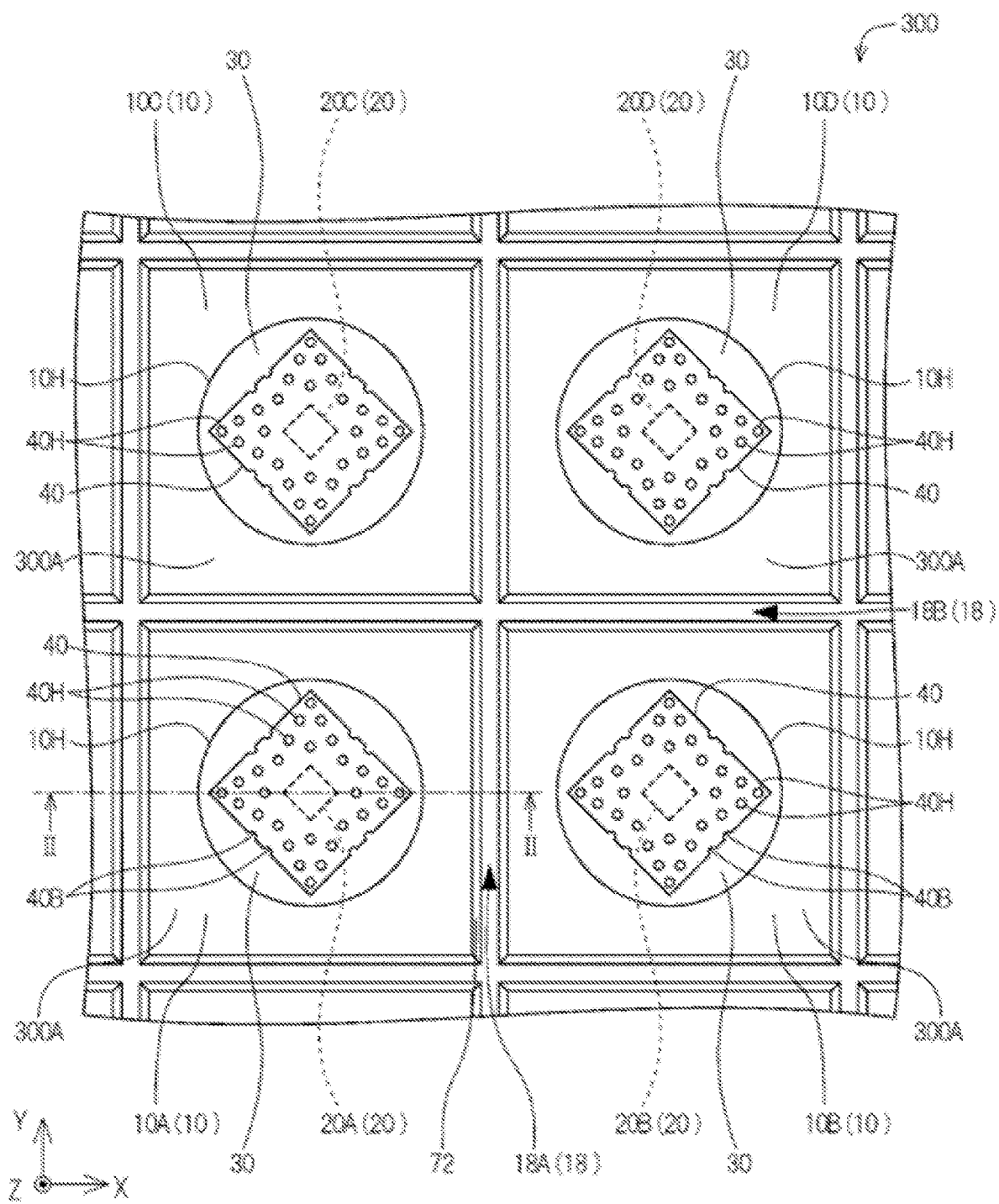
FIG. 1 is a schematic plan view of an exemplary planar light source according to an exemplary embodiment of the present disclosure.

A planar light source 300 of an embodiment will now be described with reference to FIG. 1, FIG. 2, FIGS. 3A to 3G, and FIGS. 4 to 8. Two directions parallel to a first surface 101 of a light guide member 10, which is a light-emitting surface of the planar light source 300, and are orthogonal to each other are referred to as a first direction and a second direction. A direction orthogonal to the first direction and the second direction is referred to as a third direction. In FIG. 1, the first direction is an X direction, the second direction is a Y direction, and the third direction is a Z direction. In the present specification, the first direction (X direction) and/or the second direction (Y direction) may be referred to as a lateral direction, and the third direction (Z direction) may be referred to as a vertical direction.

The planar light source 300 includes a light-emitting module 100 and a support member 200. The light-emitting module 100 is disposed on the support member 200. The light-emitting module 100 includes the light guide member 10, a light source unit 20, a first light-transmissive member 30, and a reflective member 40 (hereinafter, referred to as a first reflective member). The light guide member 10 includes the first surface 101 and a second surface 102 on an opposite side of the first surface 101. The light guide member 10 includes a first through hole 10H penetrating from the first surface 101 to the second surface 102. The light source unit 20 is disposed in the first through hole 10H of the light guide member 10. The first light-transmissive member 30 is disposed in the first through hole 10H of the light guide member 10. The first light-transmissive member 30 covers the light source unit 20. The first reflective member 40 is disposed above the light source unit 20. The first reflective member 40 is disposed above the first light-transmissive member 30. In the plan view, the outer edge of the first reflective member 40 is located outside an outer edge of the light source unit 20. The first reflective member 40 includes a resin member 41A (hereinafter, referred to as a first resin member) and a reflector 41B (hereinafter, referred to as a first reflector) having a refractive index lower than a refractive index of the first resin member 41A.

Since the first reflective member 40 is located above the light source unit 20, it is possible to inhibit a region directly above the light source unit 20 from becoming too bright. This makes it possible to reduce luminance unevenness in the light-emitting module 100.

Hereinafter, the elements constituting the planar light source 300 will be described in detail.

Light Guide Member 10

Figure 2:
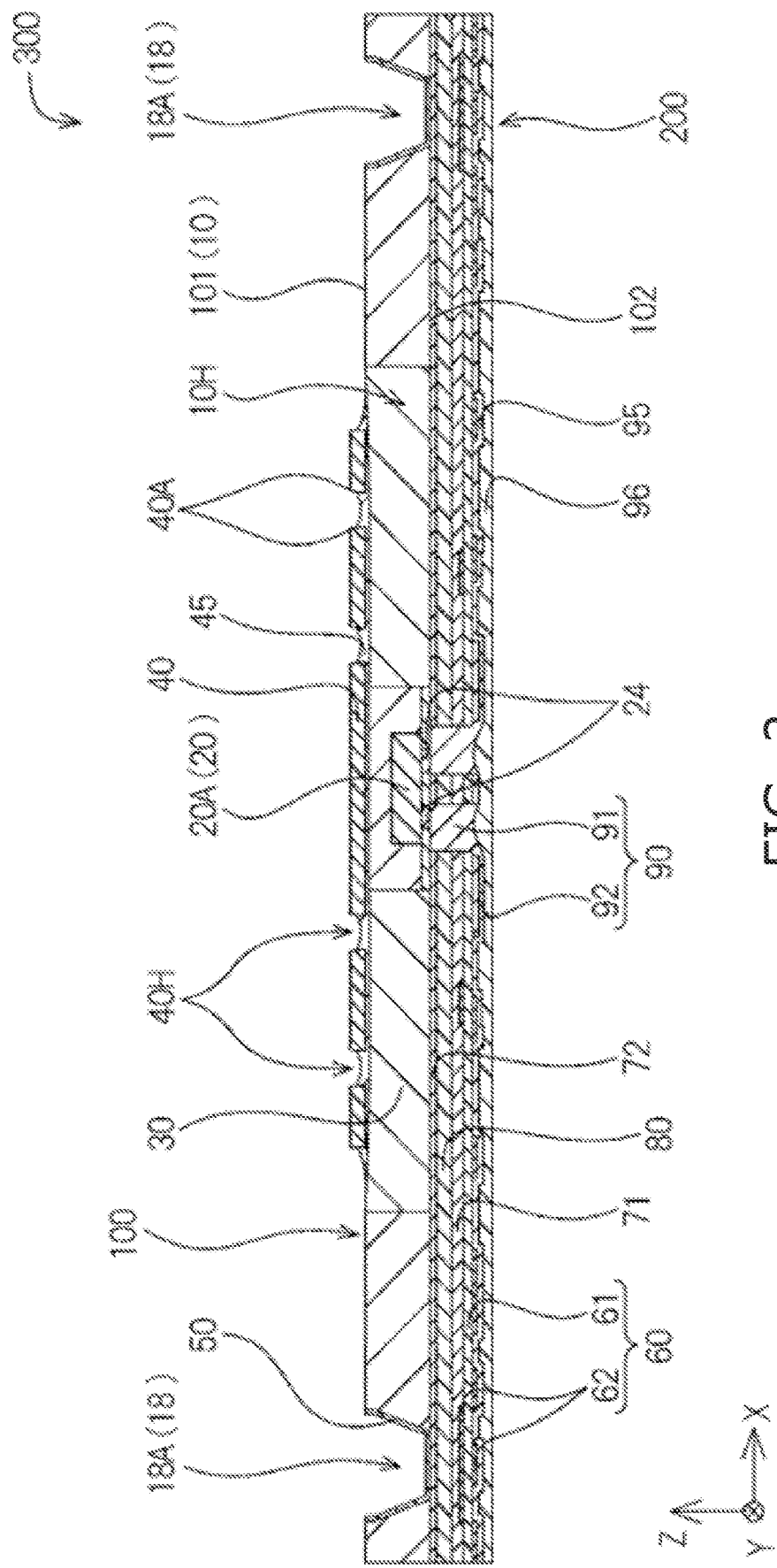
FIG. 2 is a schematic cross-sectional view taken along line II-II in FIG. 1.

The light guide member 10 is a member that is light-transmissive to light emitted by the light source unit 20. A transmittance of the light guide member 10 with respect to a peak wavelength of the first light source unit 20 is preferably, for example, 60% or more, more preferably 80% or more. In the present specification, the transmittance is a transmittance with respect to the peak wavelength of the light source unit 20. As illustrated in FIG. 2, the first light guide member 10 includes the first surface 101 serving as the light-emitting surface of the planar light source 300, and the second surface 102 located on the opposite side of the first surface 101. The light guide member 10 includes the first through hole 10H in which the light source unit 20 is disposed. In the present embodiment, the first through hole 10H has a circular shape in the plan view. In the plan view, the first through hole 10H may be an ellipse or may have a polygonal shape such as a triangle, a quadrangle, a hexagon or an octagon.

The number of light guide members 10 included in the light-emitting module 100 may be one or plural. In the present embodiment, the light-emitting module 100 includes a plurality of light guide members 10 including a first light guide portion 10A, a second light guide portion 10B, a third light guide portion 10C, and a fourth light guide portion 10D. In the first direction (X direction), the first light guide portion 10A and the second light guide portion 10B are adjacent to each other. In the first direction (X direction), the third light guide portion 10C and the fourth light guide portion 10D are adjacent to each other. In the second direction (Y direction), the first light guide portion 10A and the third light guide portion 10C are adjacent to each other. In the second direction (Y direction), the second light guide portion 10B and the fourth light guide portion 10D are adjacent to each other.

The light guide member 10 is partitioned by partition grooves 18. One region partitioned by the partition grooves 18 is referred to as a light-emitting region 300A. In the present embodiment, the first light guide portion 10A, the second light guide portion 10B, the third light guide portion 10C, and the fourth light guide portion 10D partitioned by the partition grooves 18 define different light-emitting regions 300A. One light-emitting region 300A can be used as a driving unit for local dimming. The number of light-emitting regions 300A constituting the planar light source 300 is not particularly limited. For example, the planar light source 300 may include one light-emitting region 300A or a plurality of light-emitting regions 300A. A plurality of planar light sources 300 may be arranged to prepare a planar light source device having a larger area.

In the present embodiment, the light guide member 10 includes the partition grooves 18 having a grid shape and including a first partition groove 18A extending in the second direction (Y direction) and a second partition groove 18B extending in the first direction (X direction). Between the first light guide portion 10A and the second light guide portion 10B, there is the first partition groove 18A extending in the second direction (Y direction). Between the first light guide portion 10A and the third light guide portion 10C, there is the second partition groove 18B extending in the first direction (X direction). It is preferable that each of the partition grooves 18 penetrates from the first surface 101 to the second surface 102 of the light guide member 10. By doing so, since the light guide member 10 can be separated into a plurality of pieces, for example, the warpage of the support member 200 caused by the difference in thermal expansion coefficients of the light guide member 10 and the support member 200 can be suppressed. This makes it possible to suppress the cracking of a conductive member 90 to be described below. The partition groove 18 may be a recessed portion that opens only on the first surface 101 side of the light guide member 10, or may be a recessed portion that opens only on the second surface 102 side of the light guide member 10. When the partition groove 18 is a recessed portion, the partition groove 18 has a bottom surface formed by the light guide member 10.

Examples of the material that can be used for the light guide member 10 include a thermoplastic resin such as an acrylic resin, a polycarbonate resin, a cyclic polyolefin resin, a polyethylene terephthalate resin, or a polyester resin, a thermosetting resin such as an epoxy resin or a silicone resin, or glass.

A thickness of the light guide member 10 is preferably in a range from 150 μm to 800 μm, for example. The present specification assumes that a thickness of each member is a maximum value from an upper surface of the member positioned in the third direction (Z direction) to a lower surface of the member. The light guide member 10 may be constituted by a single layer or may be constituted by a layered body of a plurality of layers in the third direction. When the light guide member 10 is constituted by a layered body, a light-transmissive adhesive may be disposed between layers. The layers of the layered body may use different kinds of chief materials. Examples of the material that can be used for the adhesive include a thermoplastic resin such as an acrylic resin, a polycarbonate resin, a cyclic polyolefin resin, a polyethylene terephthalate resin, or a polyester resin, or a thermosetting resin such as an epoxy resin or a silicone resin.

Light Source Unit 20

The light source unit 20 is disposed in the first through hole 10H of the light guide member 10. The number of light source units 20 included in the light-emitting module 100 may be one or plural. In the present embodiment, the light-emitting module 100 includes a plurality of light source units 20 including a first light source 20A, a second light source 20B, a third light source 20C, and a fourth light source 20D. The first light source 20A is disposed in the first through hole 10H of the first light guide portion 10A. The second light source 20B is disposed in the first through hole 10H of the second light guide portion 10B. The third light source 20C is disposed in the first through hole 10H of the third light guide portion 10C. The fourth light source 20D is disposed in the first through hole 10H of the fourth light guide portion 10D.

Figure 3A:
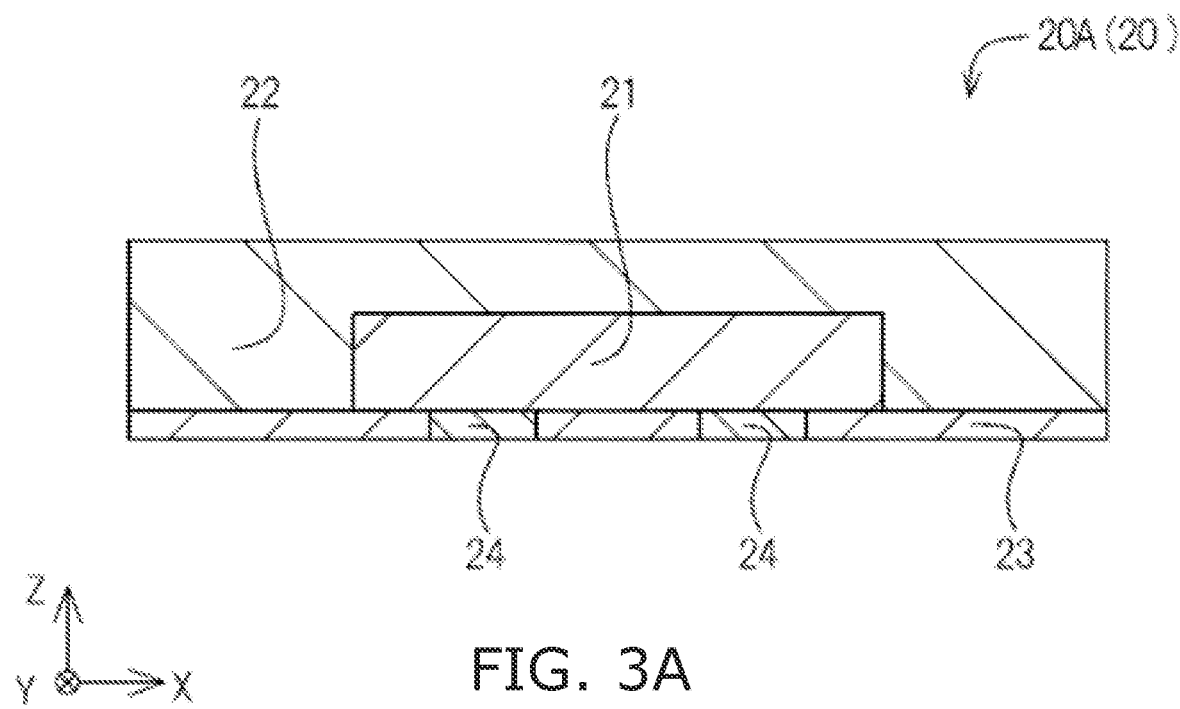
FIG. 3A is a schematic cross-sectional view of an exemplary light source unit according to the exemplary embodiment.

As illustrated in FIG. 3A, the light source unit 20 includes a light-emitting element 21. The light-emitting element 21 includes a semiconductor layered body. The semiconductor layered body includes, for example, a substrate such as sapphire or gallium nitride, an n-type semiconductor layer and a p-type semiconductor layer disposed on the substrate, and a light-emitting layer interposed between the n-type semiconductor layer and the p-type semiconductor layer. The light-emitting element 21 includes an n-side electrode electrically connected to the n-type semiconductor layer, and a p-side electrode electrically connected to the p-type semiconductor layer. The n-side electrode and the p-side electrode form a part of a lower surface of the light-emitting element 21. The light source unit 20 includes a pair of positive and negative electrodes 24. The pair of positive and negative electrodes 24 form a part of a lower surface of the light source unit 20. One of the pair of electrodes 24 is electrically connected to the p-side electrode, and the other is electrically connected to the n-side electrode.

The semiconductor layered body from which the substrate is eliminated may be used. Further, a structure of the light-emitting layer may be a structure including a single active layer such as a double heterostructure and a single quantum well (SQW) structure, or a structure including an active layer group such as a multiple quantum well (MQW) structure. The light-emitting layer can emit visible light or ultraviolet light. The light-emitting layer can emit light as visible light from blue to red. As the semiconductor layered body including such a light-emitting layer, for example, $In_xAl_yGa_{1-x-y}N$ ($0 \leq x$, $0 \leq y$, $x+y \leq 1$) can be included. The semiconductor layered body can include at least one light-emitting layer that can achieve the light emission described above. For example, the semiconductor layered body may have a structure including one or more light-emitting layers between the n-type semiconductor layer and the p-type semiconductor layer, or may have a structure in which a structure including the n-type semiconductor layer, the light-emitting layer, and the p-type semiconductor layer in order is repeated multiple times. When the semiconductor layered body includes the plurality of light-emitting layers, the semiconductor layered body may include the light-emitting layers having different light emission peak wavelengths, or may include the light-emitting layers having the same light emission peak wavelength. Note that the same light emission peak wavelength may have a variation of approximately several nm, for example. A combination of such light-emitting layers can be selected as appropriate, and, for example, when the semiconductor layered body includes two light-emitting layers, the light-emitting layers can be selected from combinations of blue light and blue light, green light and green light, red light and red light, ultraviolet light and ultraviolet light, blue light and green light, blue light and red light, green light and red light, and the like. The light-emitting layer may include a plurality of active layers having different light emission peak wavelengths, or may include a plurality of active layers having the same light emission peak wavelength.

As illustrated in FIG. 3A, the light source unit 20 may further include a light-transmissive member 22 (hereinafter, referred to as a light source light-transmissive member). The light source light-transmissive member 22 covers an upper surface and side surfaces of the light-emitting element 21. The light source light-transmissive member 22 protects the light-emitting element 21 and includes functions such as wavelength conversion and light diffusion in accordance with particles added to the light source light-transmissive member 22.

For example, the light source light-transmissive member 22 includes a light-transmissive resin, and may further include a phosphor. Examples of the light-transmissive resin that can be used include a silicone resin, or an epoxy resin. Examples of the phosphor that can be used include an oxynitride based phosphor such as an yttrium aluminum garnet based phosphor (for example, $Y_3(Al,Ga)_5O_{12}:Ce$), a lutetium aluminum garnet based phosphor (for example, Lu3(Al,Ga)5O12:Ce), a terbium aluminum garnet based phosphor (for example, Tb3(Al,Ga)5O12:Ce), a CCA based phosphor (for example, Ca10(PO4)6C2:Eu), a SAE based phosphor (for example, Sr4Al14O25:Eu), a chlorosilicate based phosphor (for example, Ca8MgSi4O16Cl2:Eu), a β-sialon based phosphor (for example, (Si,Al)3(O,N)4:Eu), or an α-sialon based phosphor (for example, Ca(Si,Al)12 (O,N)16:Eu), a nitride based phosphor such as an SLA based phosphor (for example, SrLiAl3N4:Eu), a CASN based phosphor (for example, CaAlSiN3:Eu), or an SCASN based phosphor (for example, (Sr,Ca)AlSiN3:Eu), a fluoride based phosphor such as a KSF based phosphor (for example, K2SiF6:Mn), a KSAF based phosphor (for example, K2Si0.99Al0.01F5.99:Mn), or an MGF based phosphor (for example, 3.5MgO·0.5MgF2·GeO2:Mn), a phosphor having a perovskite structure (for example, CsPb(F,Cl,Br,I)3), or a quantum dot phosphor (for example, CdSe, InP, AgInS2, or AgInSe2). As the phosphor added to the light source light-transmissive member 22, one type of phosphor may be used, or a plurality of types of phosphors may be used.

The KSAF based phosphor may have a composition represented by Formula (I).

(I)

In Formula (I), M represents an alkali metal and may include at least K. Mn may be a tetravalent Mn ion. p, q, r, and s may satisfy 0.9≤p+q+r≤1.1, 0≤q≤0.1, 0<r≤0.2, and 5.9≤s≤6.1. Preferably 0.95≤p+q+r≤1.05 or 0.97≤p+q+r≤1.03, 0<q≤0.03, 0.002≤q≤0.02 or 0.003≤q≤0.015, 0.005≤r≤0.15, 0.01≤r≤0.12 or 0.015≤r≤0.1, and 5.92≤s≤6.05 or 5.95≤s≤6.025. Examples of the composition represented by Formula (I) include compositions represented by K2 [Si0.946Al0.005Mn0.049F5.995], K2 [Si0.942Al0.008Mn0.050F5.992], K2 [Si0.939Al0.014Mn0.047F5.986]. Such a KSAF based phosphor enables red light emission having a high luminance and a narrow half-value width of the light emission peak wavelength.

Further, a wavelength conversion sheet containing the phosphor described above may be disposed on the planar light source 300. The wavelength conversion sheet can serve as a planar light source that absorbs a portion of the blue light from the light source unit 20, emits yellow light, green light, and/or red light, and outputs white light. For example, the light source unit 20 that can emit blue light and the wavelength conversion sheet containing a phosphor that can emit yellow light can be combined to produce white light. Alternatively, the light source unit 20 that can emit blue light and the wavelength conversion sheet containing a red phosphor and a green phosphor may be combined. Further, the light source unit 20 that can emit blue light and a plurality of the wavelength conversion sheets may be combined. An example of the plurality of wavelength conversion sheets that can be selected includes a combination of the wavelength conversion sheet containing the phosphor that can emit red light and the wavelength conversion sheet containing the phosphor that can emit green light. Further, the light source unit 20 including the light-emitting element 21 that can emit blue light and the light source light-transmissive member 22 containing a phosphor that can emit red light, and a wavelength conversion sheet containing a phosphor that can emit green light may be combined.

As a yellow phosphor used in the wavelength conversion sheet, the yttrium aluminum garnet based phosphor is preferably used, for example. Further, as a green phosphor used in the wavelength conversion sheet, for example, the phosphor having the perovskite structure or the quantum dot phosphor described above with a narrow half-value width of a light emission peak wavelength is preferably used. Further, as a red phosphor used in the wavelength conversion sheet, for example, the KSF based phosphor, the KSAF based phosphor, or the quantum dot phosphor described above with a narrow half-value width of a light emission peak wavelength is preferably used similarly to the green phosphor.

The light source unit 20 may further include a covering member 23. The covering member 23 is disposed on a lower surface of the light-emitting element 21. The covering member 23 is disposed so that a lower surface of the electrodes 24 of the light source unit 20 is exposed from the covering member 23. The covering member 23 is also disposed on a lower surface of the light source light-transmissive member 22 covering a side surfaces of the light-emitting element 21.

The covering member 23 has reflectivity to the light emitted from the light source unit 20. The covering member 23 is, for example, a resin member including light scattering particles. Examples of the light scattering particles of the covering member 23 that can be used include particles such as titania, silica, alumina, zinc oxide, magnesium oxide, zirconia, yttria, calcium fluoride, magnesium fluoride, niobium pentoxide, barium titanate, tantalum pentoxide, barium sulfate, or glass. Examples of the resin material of the covering member 23 that can be used include a thermoplastic resin such as an acrylic resin, a polycarbonate resin, a cyclic polyolefin resin, a polyethylene terephthalate resin, or a polyester resin, or a thermosetting resin such as an epoxy resin or a silicone resin.

Figure 3B:
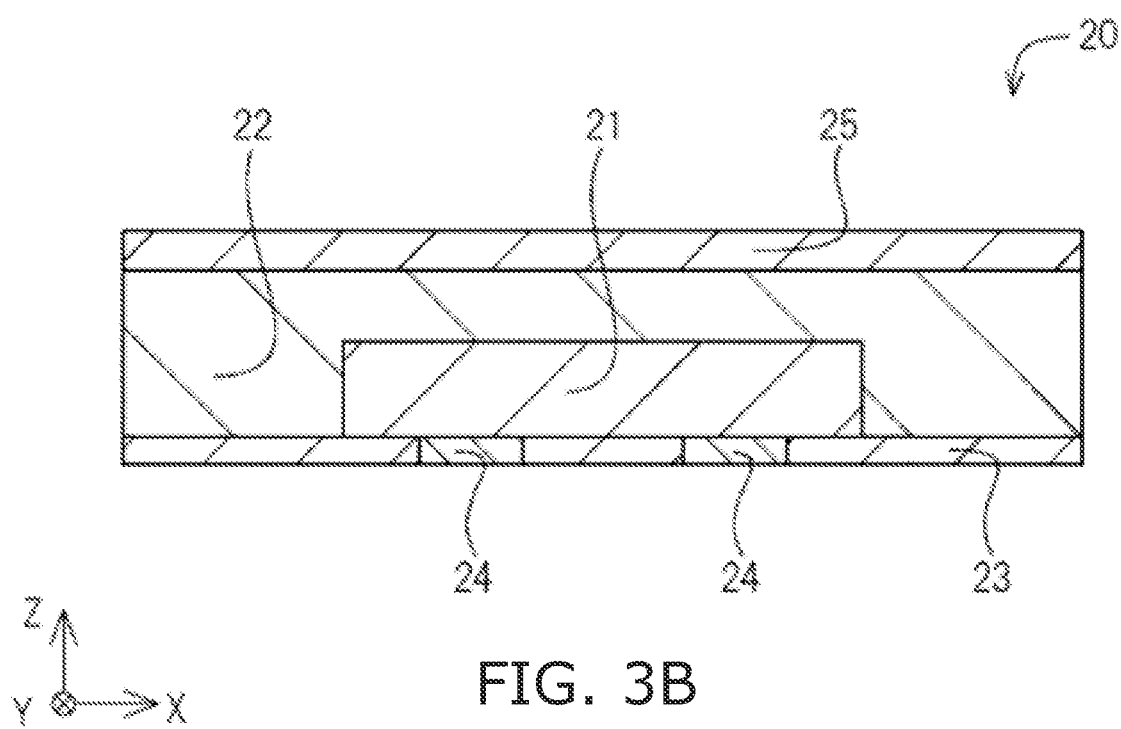
FIG. 3B is a schematic cross-sectional view of a modification of the exemplary light source unit according to the exemplary embodiment.

As illustrated in FIG. 3B, the light source unit 20 may further include a light adjustment member 25. The light adjustment member 25 constitutes at least a part of an upper surface of the light source unit 20. The light adjustment member 25 is disposed above the light-emitting element 21. The light adjustment member 25 is disposed above the light source light-transmissive member 22, and adjusts an amount and an output direction of light output from an upper surface of the light source light-transmissive member 22. The light adjustment member 25 has reflectivity and is light-transmissive to light emitted by the light-emitting element 21. A part of the light output from the upper surface of the light source light-transmissive member 22 is reflected by the light adjustment member 25, and the other part is transmitted through the light adjustment member 25. A transmittance of the light adjustment member 25 with respect to a peak wavelength of the light-emitting element 21 is, preferably in a range from 1% to 50%, more preferably in a range from 3% to 30%, for example. Since the light source unit 20 includes the light adjustment member 25, it is possible to inhibit a region directly above the light source unit 20 from becoming too bright. This makes it possible to reduce luminance unevenness in the light-emitting module 100.

The light adjustment member 25 is consisting essentially of a light-transmissive resin and light scattering particles included in the light-transmissive resin. Examples of the light-transmissive resin of the light adjustment member 25 that can be used include a thermoplastic resin such as an acrylic resin, a polycarbonate resin, a cyclic polyolefin resin, a polyethylene terephthalate resin, or a polyester resin, or a thermosetting resin such as an epoxy resin or a silicone resin. Examples of the light scattering particles of the light adjustment member 25 that can be used include particles such as titania, silica, alumina, zinc oxide, magnesium oxide, zirconia, yttria, calcium fluoride, magnesium fluoride, niobium pentoxide, barium titanate, tantalum pentoxide, barium sulfate, or glass. The light adjustment member 25 may be, for example, a metal member such as aluminum or silver, or a dielectric multilayer film.

As illustrated in FIG. 3A, the light source unit 20 may not include the light adjustment member 25. This makes it easier to downsize the light source unit 20 in the third direction (Z direction) than when the light source unit 20 includes the light adjustment member 25 disposed above the light-emitting element 21. This makes it easy to downsize the light-emitting module 100 in the third direction (Z direction). In another form, the light source unit 20 may not include the covering member 23. For example, a lower surface of the light source unit may be formed by the lower surface of the light-emitting element, the lower surface of the pair of electrodes 24, and the lower surface of the light source light-transmissive member. In another form, the light source unit 20 may be only a single light-emitting element 21. In another form, the light source unit 20 may not include the covering member 23 and the light source light-transmissive member 22, and may include the light adjustment member 25 disposed on the upper surface of the light-emitting element 21. In another form, the light source unit 20 may not include the light source light-transmissive member 22, and may include the light adjustment member 25 disposed on the upper surface of the light-emitting element 21 and the covering member 23 disposed on the lower surface of the light-emitting element 21.

In the plan view, the shape of the light source unit 20 is not particularly limited. In the plan view, the light source unit 20 may have, for example, a shape such as a circular, triangular, quadrangular, hexagonal, or octagonal shape. In the plan view, when the shape of the light source part 20 is quadrangular, a pair of outer edges of the light source unit 20 may be parallel to the first direction (X direction) or may be inclined with respect to the first direction (X direction). In the present embodiment, the pair of outer edges of the light source unit 20 are inclined at 45° with respect to the first direction (X direction).

Figure 3C:
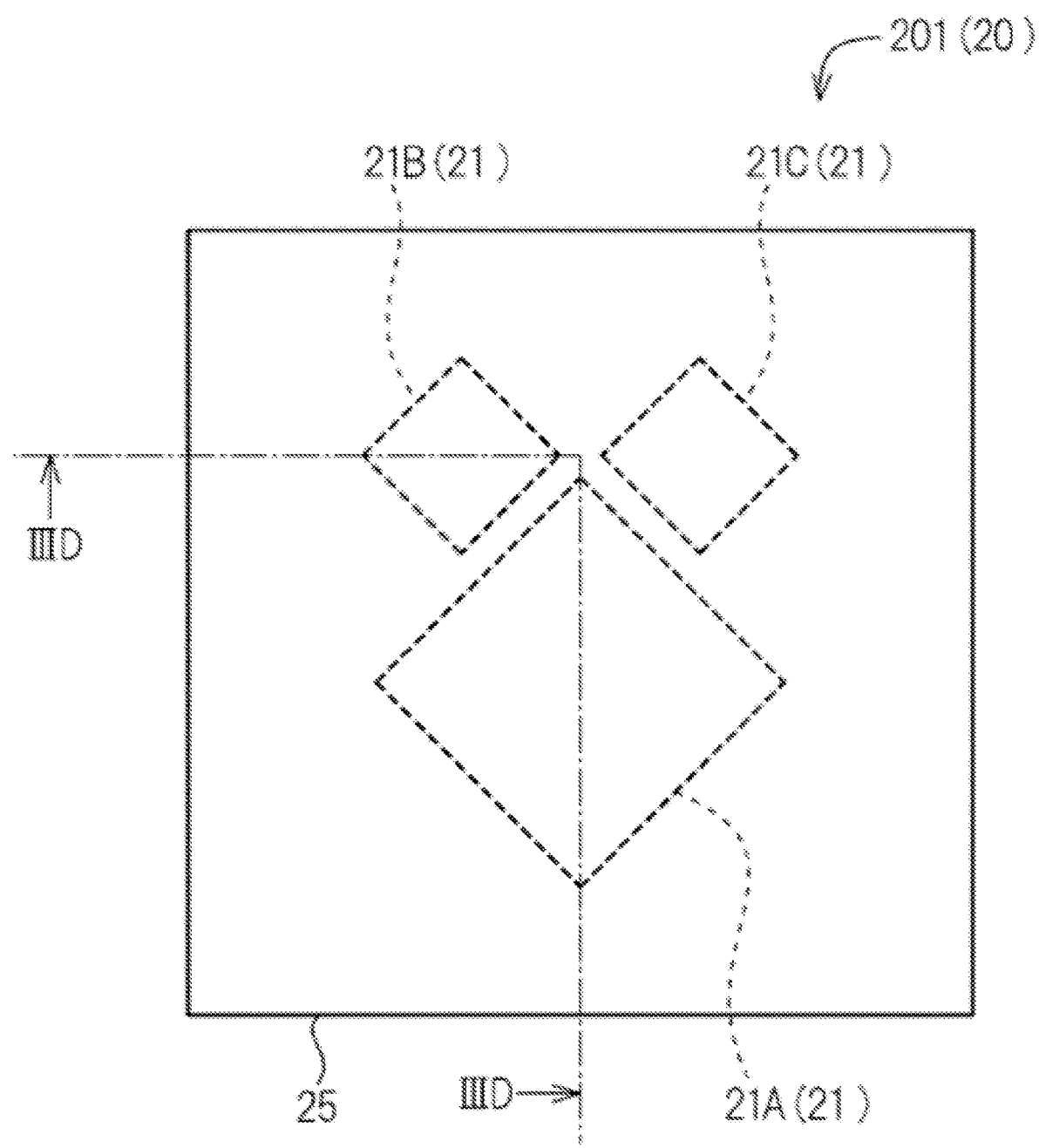
FIG. 3C is a schematic plan view illustrating a modification of the exemplary light source unit according to the exemplary embodiment.

As illustrated in FIG. 3C, the light source unit 20 can be used as a light source unit 201 including a plurality of light-emitting elements 21. The plurality of light-emitting elements 21 include a first light-emitting element 21A, a second light-emitting element 21B, and a third light-emitting element 21C. A light emission peak wavelength of the first light-emitting element 21A, a light emission peak wavelength of the second light-emitting element 21B, and a light emission peak wavelength of the third light-emitting element 21C are not particularly limited. For example, the light emission peak wavelength of the first light-emitting element 21A, the light emission peak wavelength of the second light-emitting element 21B, and the light emission peak wavelength of the third light-emitting element 21C may be the same or different from each other. It is preferable that the light emission peak wavelength of the first light-emitting element 21A be 610 nm or more and less than 780 nm, the light emission peak wavelength of the second light-emitting element 21B be 460 nm or more and less than 500 nm, and the light emission peak wavelength of the third light-emitting element 21C be 500 nm or more and less than 570 nm. By doing so, it is possible to produce the light source unit 201 that emits white light by combining red light of the first light-emitting element 21A, blue light of the second light-emitting element 21B, and green light of the third light-emitting element 21C.

In the plan view, the first light-emitting element 21A, the second light-emitting element 21B, and the third light-emitting element 21C are not particularly limited in area. For example, when the first light-emitting element 21A emits red light and the second light-emitting element 21B emits blue light, the area of the first light-emitting element 21A is preferably larger than the area of the second light-emitting element 21B in the plan view. In general, the light emission efficiency of the first light-emitting element 21A that emits red light is lower than the light emission efficiency of the second light-emitting element 21B that emits blue light. Therefore, in the plan view, the area of the first light-emitting element 21A that emits red light is larger than the area of the second light-emitting element 21B that emits blue light, so that light of the first light-emitting element 21A having a lower light emission efficiency than the second light-emitting element 21B can be strengthened. When the first light-emitting element 21A emits red light and the third light-emitting element 21C emits green light, the area of the first light-emitting element 21A is preferably larger than the area of the third light-emitting element 21C in the plan view.

Figure 3D:
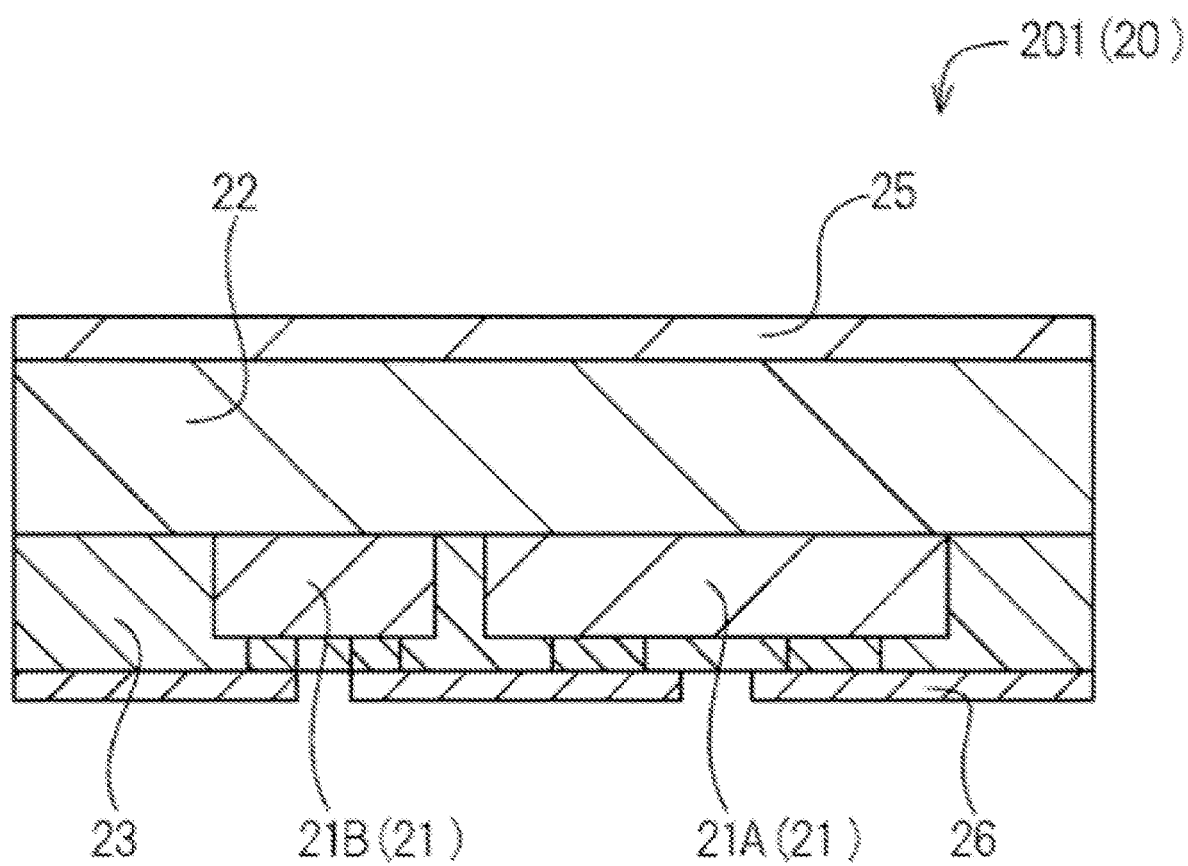
FIG. 3D is a schematic cross-sectional view taken along line IIID-IIID in FIG. 3C.

The light source light-transmissive member 22 of a light source unit 201 illustrated in FIG. 3D covers an upper surface of the first light-emitting element 21A and an upper surface of the second light-emitting element 21B. The upper surface of the first light-emitting element 21A and the upper surface of the second light-emitting element 21B are covered by the light source light-transmissive member 22, so that light emitted from the first light-emitting element 21A and light emitted from the second light-emitting element 21B can be mixed in the light source light-transmissive member 22. This makes it possible to suppress luminance unevenness of light emitted from the light source unit 201. Note that the light source light-transmissive member 22 of the light source unit 201 covers an upper surface of the third light-emitting element 21C.

The covering member 23 of the light source unit 201 covers a side surface of the first light-emitting element 21A and a side surface of the second light-emitting element 21B. By doing so, a part of light emitted from the side surface of the first light-emitting element 21A is reflected by the covering member 23. Therefore, the light emitted from the side surface of the first light-emitting element 21A can be inhibited from being absorbed by the second light-emitting element 21B. This improves the light extraction efficiency of the light source unit 201. Note that the covering member 23 of the light source unit 201 covers a side surface of the third light-emitting element 21C.

As illustrated in FIG. 3D, the light source unit 201 includes the light adjustment member 25 that covers the upper surface of the light source light-transmissive member 22. Note that the light source unit 201 may not include the light adjustment member 25.

Figure 3E:
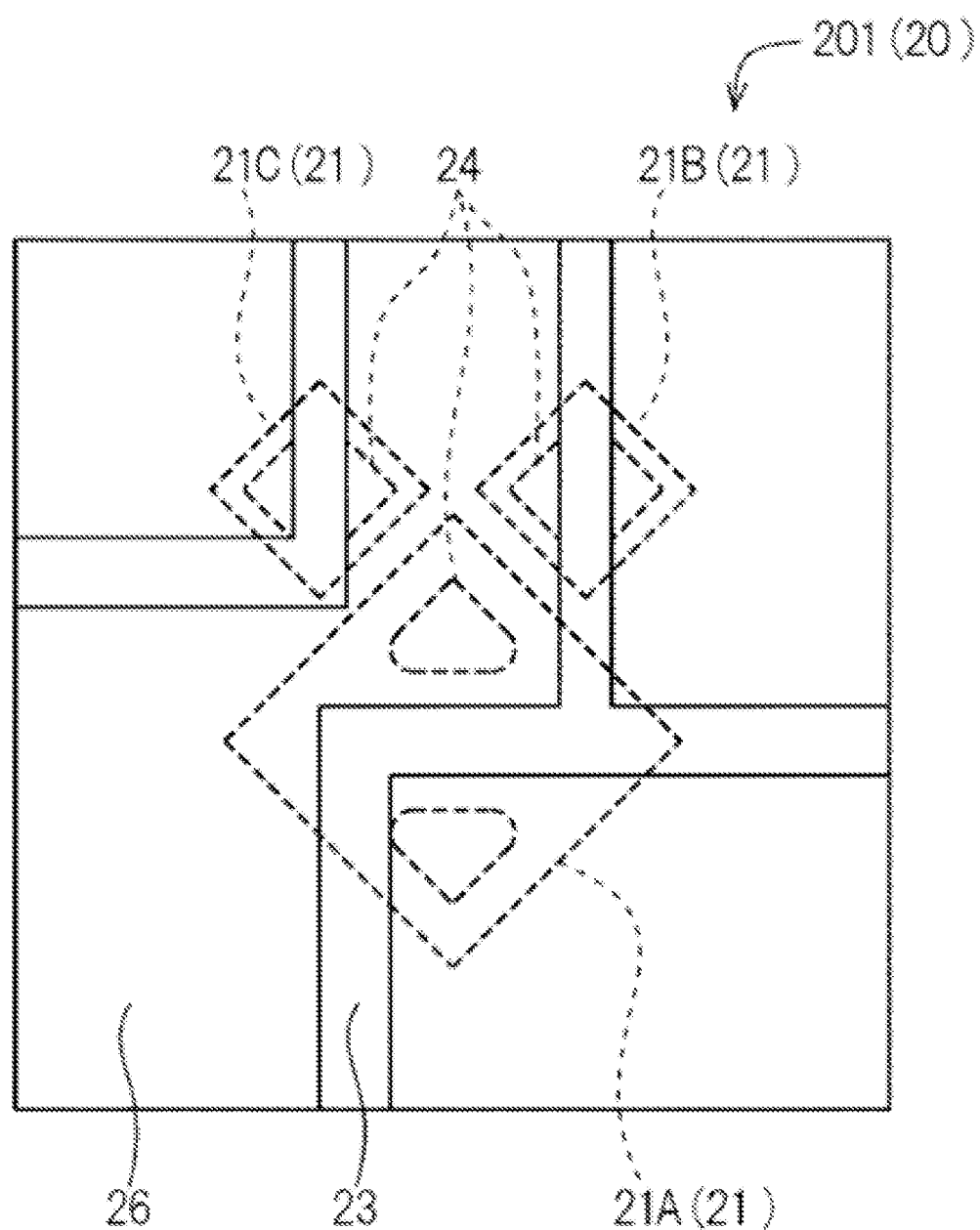
FIG. 3E is a schematic bottom view of a modification of the exemplary light source unit according to the exemplary embodiment.

As illustrated in FIGS. 3D and 3E, the light source unit 201 includes a conductive layer 26 electrically connected to an electrode of the light-emitting element 21. It is preferable that a plurality of light-emitting elements 21 can be independently driven. This makes it easy to adjust the luminance of the light source unit 201. Note that the plurality of light-emitting elements 21 may be connected in series, may be connected in parallel, or may be connected in a combination of series connection and parallel connection.

Figure 3F:
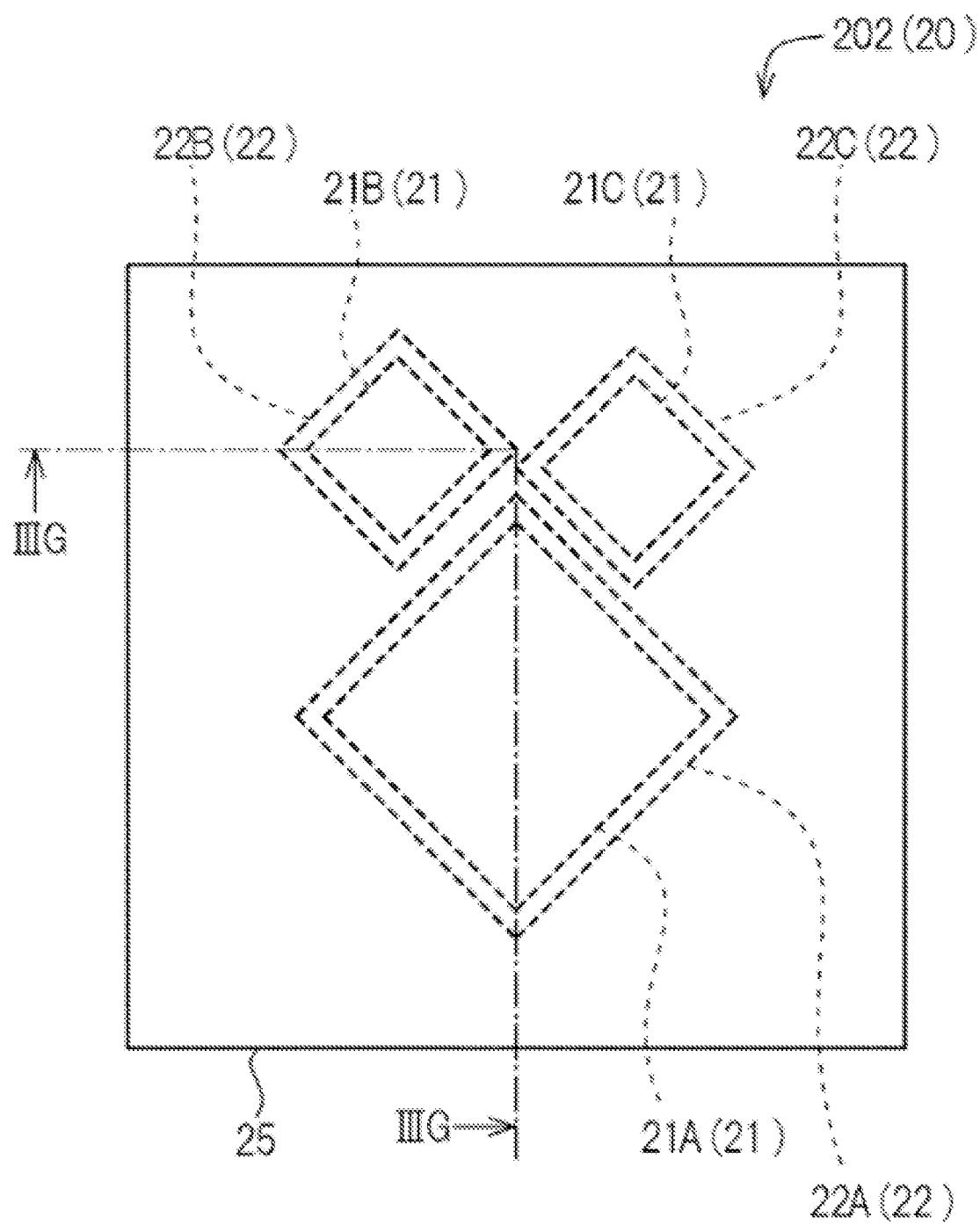
FIG. 3F is a schematic plan view of a modification of the exemplary light source unit according to the exemplary embodiment.
Figure 3G:
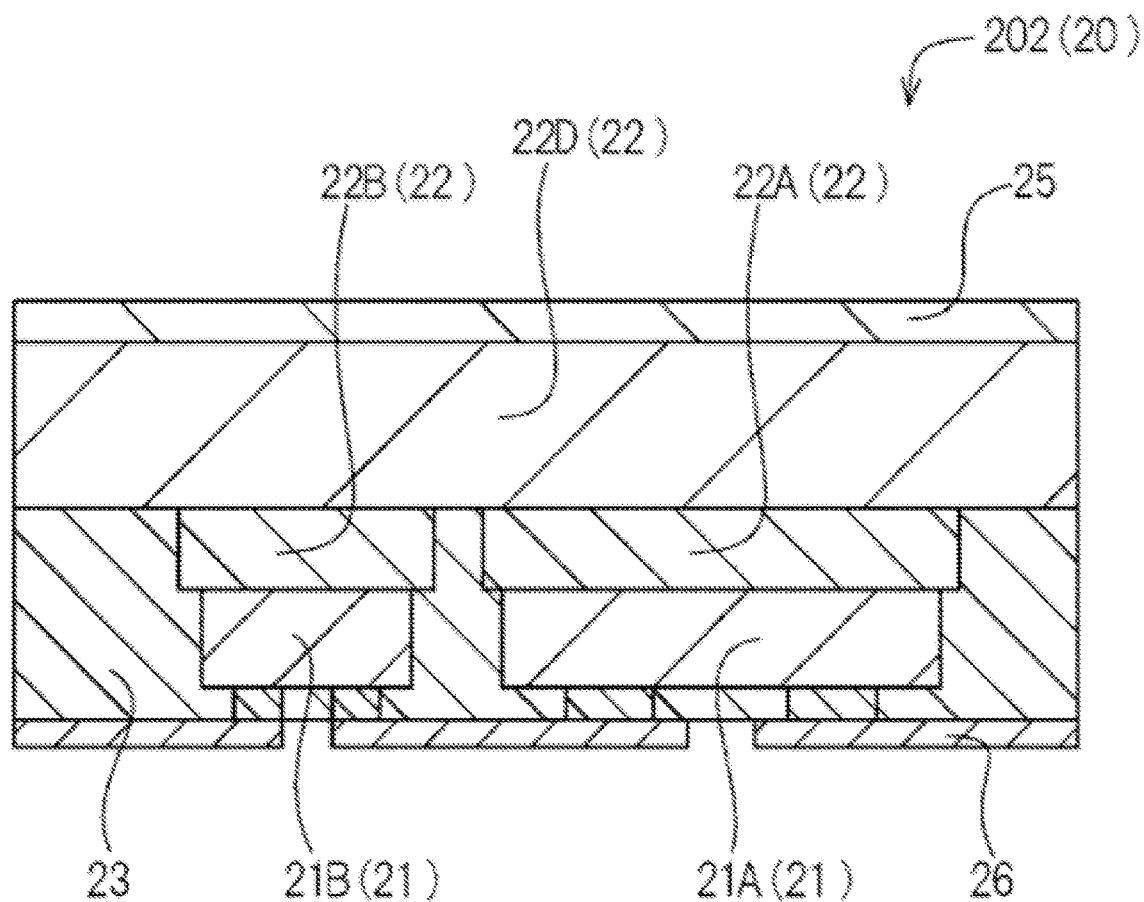
FIG. 3G is a schematic cross-sectional view taken along line IIIG-IIIG in FIG. 3F.

As illustrated in FIG. 3F, the light source unit 20 can be a light source unit 202 including a plurality of light-emitting elements 21 consisting of the first light-emitting element 21A, the second light-emitting element 21B, and the third light-emitting element 21C. As illustrated in FIG. 3G, the light source light-transmissive member 22 of the light source unit 202 includes a first light source light-transmissive member 22A that covers the upper surface of the first light-emitting element 21A and the second light source light-transmissive member 22B that covers the upper surface of the second light-emitting element 21B. The light emission peak wavelength of the first light-emitting element 21A is 460 nm or more and less than 500 nm, the light emission peak wavelength of the second light-emitting element 21B and the light emission peak wavelength of the third light-emitting element 21C are 500 nm or more and less than 570 nm, and the first light source light-transmissive member 22A includes a red phosphor. By doing so, it is possible to produce the light source unit 202 that emits white light by combining blue light of the first light-emitting element 21A, green light of the second light-emitting element 21B and the third light-emitting element 21C, and red light of the first light source light-transmissive member 22A. Examples of the red phosphor include a KSF-based phosphor, and a KSAF-based phosphor. A color that can be produced by a light-emitting element 21 and a color that can be produced by the phosphor are not particularly limited. For example, a light-emitting element 21 that can emit blue light and a phosphor that can emit yellow light may be combined to produce white light, or a light-emitting element 21 that can emit blue light, a light-emitting element 21 that can emit red light, and a phosphor that can emit green light may be combined to produce white light. Note that the light source light-transmissive member 22 of the light source unit 202 includes a third light source light-transmissive member 22C that covers the upper surface of the third light-emitting element 21C.

The light source light-transmissive member 22 of the light source unit 202 includes a fourth light source light-transmissive member 22D that covers an upper surface of the first light source light-transmissive member 22A and an upper surface of the second light source light-transmissive member 22B. The upper surface of the first light source light-transmissive member 22A and the upper surface of the second light source light-transmissive member 22B are covered by the fourth light source light-transmissive member 22D, so that light emitted from the first light source light-transmissive member 22A and light emitted from the second light source light-transmissive member 22B can be mixed in the fourth light source light-transmissive member 22D. This makes it possible to suppress luminance unevenness of light emitted from the light source unit 202. Note that the fourth light source light-transmissive member 22D covers an upper surface of the third light source light-transmissive member 22C.

The covering member 23 of the light source unit 202 covers the side surface of the first light-emitting element 21A, a side surface of the first light source light-transmissive member 22A, the side surface of the second light-emitting element 21B, and a side surface of the second light source light-transmissive member 22B. By doing so, a part of light emitted from the side surface of the first light-emitting element 21A is reflected by the covering member 23. Therefore, the light emitted from the side surface of the first light-emitting element 21A can be inhibited from being absorbed by the second light-emitting element 21B and/or the second light source light-transmissive member 22B. This improves the light extraction efficiency of the light source unit 202. Note that the covering member 23 covers the side surface of the third light-emitting element 21C and a side surface of the third light source light-transmissive member 22C.

As illustrated in FIG. 3G, the light source unit 202 includes the light adjustment member 25 that covers the upper surface of the light source light-transmissive member 22. Note that the light source unit 202 may not include the light adjustment member 25. The light source unit 202 includes the conductive layer 26 electrically connected to the electrode of the light-emitting element 21.

First Light-Transmissive Member 30

The first light-transmissive member 30 is a member that is light-transmissive to the light emitted from the light source unit 20. A transmittance of the first light-transmissive member 30 with respect to the peak wavelength of the light source unit 20 is preferably, for example, 660% or more, more preferably 80% or more. Examples of the material of the first light-transmissive member 30 that can be used include a thermosetting resin such as an epoxy resin or a silicone resin, or a thermoplastic resin such as acrylic resin, a polycarbonate resin, a cyclic polyolefin resin, a polyethylene terephthalate resin or a polyester resin.

The first light-transmissive member 30 is disposed in the first through hole 10H of the light guide member 10. The first light-transmissive member 30 covers the light source unit 20. The number of first light-transmissive members 30 included in the light-emitting module 100 may be one or plural. In the present embodiment, the light-emitting module 100 includes the plurality of first light-transmissive members 30, and the plurality of first light-transmissive members 30 each cover the light source unit 20.

As shown in FIG. 2, the first light-transmissive member 30 is preferably in contact with the light source unit 20 and the light guide member 10. By doing so, the light from the light source unit 20 is likely to enter the light guide member 10. The refractive index of a base material of the first light-transmissive member 30 is preferably lower than the refractive index of a base material of the light guide member 10. By doing so, light traveling from the first light-transmissive member 30 to the light guide member 10 can be inhibited from being totally reflected at an interface between the first light-transmissive member 30 and the light guide member 10. As a result, the light from the light source unit 20 is easily guided to the light guide member 10, so that luminance unevenness in the light-emitting module 100 is easily reduced. In the present specification, the refractive index is a refractive index with respect to the peak wavelength of the light source unit 20.

As illustrated in FIG. 2, it is preferable that the first light-transmissive member 30 be disposed to expose at least a part of the upper surface of the light source unit 20. By doing so, it becomes easier to downsize the light-emitting module 100 in the third direction (Z direction) than when the first light-transmissive member 30 covers the entire upper surface of the light source unit 20. Note that the first light-transmissive member 30 may cover the upper surface of the light source unit 20. The first light-transmissive member 30 covers the upper surface of the light source unit 20, thereby facilitating adjustment of luminance in a region directly above the light source unit 20. For example, by changing the thickness of the first light-transmissive member 30 covering the upper surface of the light source unit 20, luminance in a region directly above the light source unit 20 can be adjusted. This makes it easy to adjust luminance, so it is easy to reduce luminance unevenness in the light-emitting module 100.

The first light-transmissive member 30 may be constituted by a single layer or may be constituted by a layered body of a plurality of layers in the third direction (Z direction). The first light-transmissive member 30 may include a phosphor or light scattering particles. When the first light-transmissive member 30 is a layered body, each layer may or may not include a phosphor and/or light scattering particles. For example, the first light-transmissive member 30 may be formed of a layer including a phosphor and a layer that does not include a phosphor.

First Reflective Member 40

The first reflective member 40 is a member having reflectivity with respect to the light emitted by the light source unit 20. A reflectivity of the first reflective member 40 is preferably, for example, 60% or more, more preferably 80% or more. In the present specification, the reflectivity is a reflectivity with respect to the peak wavelength of the light source unit 20. The first reflective member 40 may be constituted by a single layer or may be constituted by a layered body of a plurality of layers.

As illustrated in FIG. 2, the first reflective member 40 is disposed above the light source unit 20. This makes it possible to inhibit a region directly above the light source unit 20 from becoming too bright. The first reflective member 40 is disposed above the first light-transmissive member 30. In the plan view, the outer edge of the first reflective member 40 is located outside the outer edge of the light source unit 20. This makes it possible to inhibit a peripheral region directly above the light source unit 20 from becoming too bright. In the present specification, when the first reflective member 40 is disposed above the light source unit 20, the first reflective member 40 and the light source unit 20 overlap in the plan view, and the first reflective member 40 is located in the upward direction of the light source unit 20 in the overlapping portion. The upward direction is a direction from the second surface 102 side to the first surface 101 side of the light guide member 10 in the third direction (Z direction). The downward direction is a direction from the first surface 101 side to the second surface 102 side of the light guide member 10 in the third direction (Z direction). In the present specification, when the first reflective member 40 is disposed above the first light-transmissive member 30, the first reflective member 40 and the first light-transmissive member 30 overlap in the plan view, and the first reflective member 40 is located in the upward direction of the first light-transmissive member 30 in the overlapping portion. The number of first reflective members 40 included in the light-emitting module 100 may be one or plural. In the present embodiment, the light-emitting module 100 includes a plurality of first reflective members 40, and the plurality of first reflective members 40 are each disposed above the light source unit 20.

Figure 4:
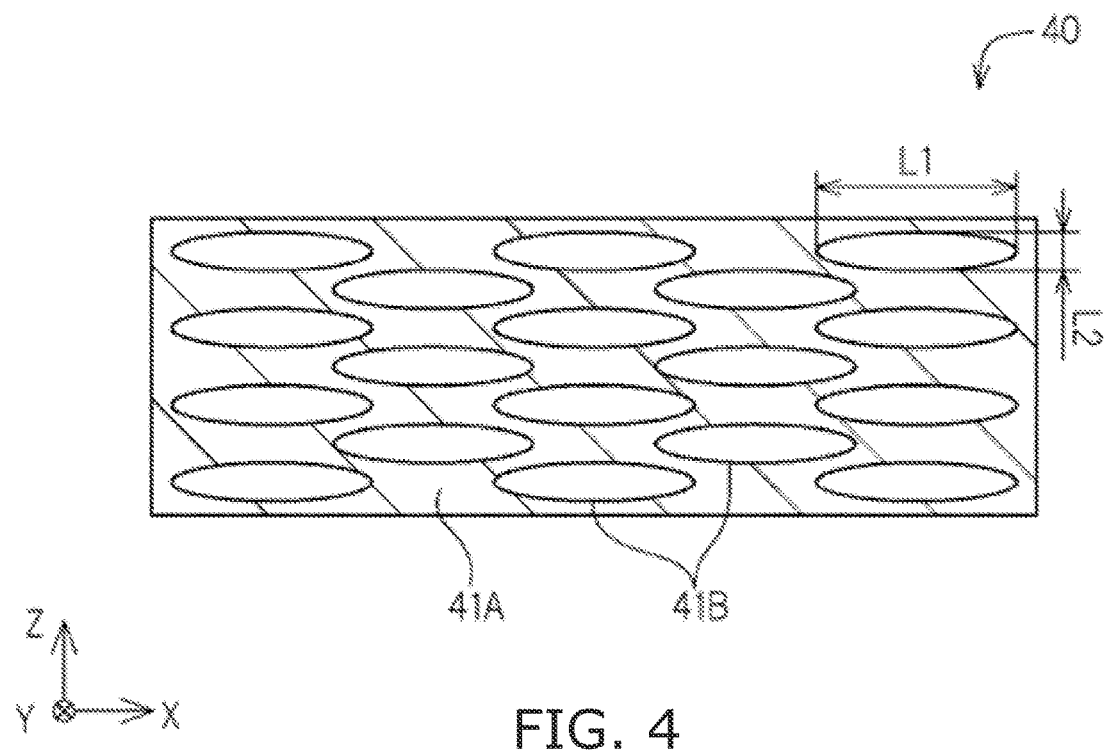
FIG. 4 is a schematic cross-sectional view of an exemplary first reflective member according to the exemplary embodiment.
Figure 5:
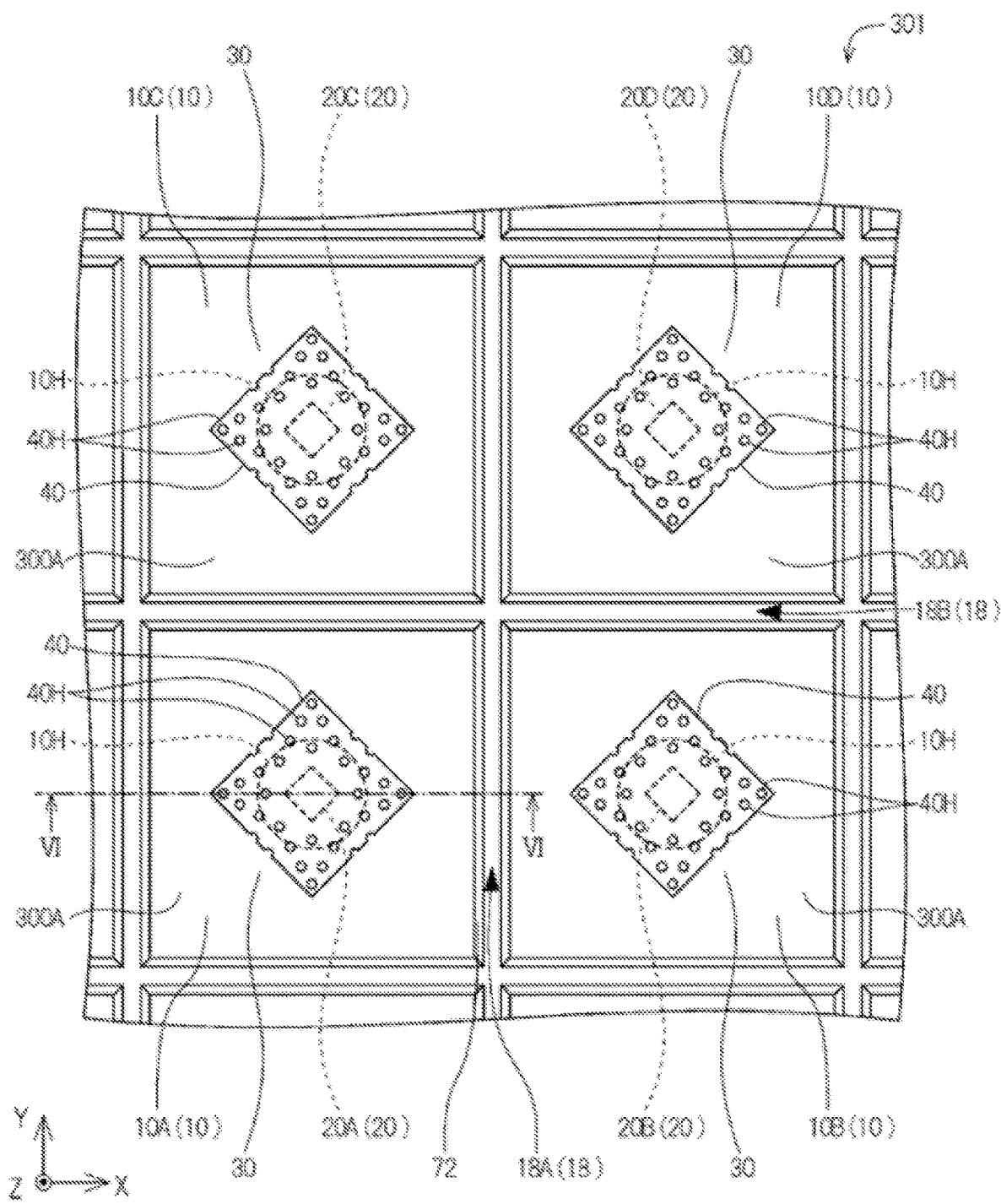
FIG. 5 is a schematic plan view of a modification of the exemplary planar light source according to the exemplary embodiment.

As illustrated in FIG. 4, the first reflective member 40 includes a first resin member 41A and a first reflector 41B having a lower refractive index than the first resin member 41A. By doing so, a part of the light from the light source unit 20 incident on the first resin member 41A is totally reflected at an interface between the first resin member 41A and the first reflector 41B. Therefore, light can be inhibited from escaping above the light source unit 20, so that it is possible to inhibit a region directly above the light source unit 20 from becoming too bright. This makes it possible to reduce luminance unevenness in the light-emitting module 100.

A refractive index of the first resin member 41A is preferably higher than the refractive index of the base material of the first light-transmissive member 30. By doing so, it becomes easy to increase the difference in refractive index between the first resin member 41A and the first reflector 41B. As a result, a part of light traveling from the first resin member 41A to the first reflector 41B is easily totally reflected at the interface between the first resin member 41A and the first reflector 41B. This makes it possible to inhibit light from escaping above the light source unit 20, so that it is possible to inhibit a region directly above the light source unit 20 from becoming too bright.

As illustrated in FIG. 4, in the cross-sectional view, the first reflector 41B preferably has a maximum length L1 in the lateral direction (X direction and/or Y direction) longer than a maximum length L2 in the vertical direction (Z direction). By doing so, the surface of the first reflector 41B facing the light source unit 20 more easily approaches a flat surface than when the first reflector 41B is spherical. As a result, when the light emitted from the light source unit 20 is reflected by a part of the first reflective member 40 located around the light source unit 20 in the plan view, the light is likely to be reflected in a direction away from the light source unit 20. As a result, the amount of the light emitted from the light source unit 20 absorbed by the light source unit 20 can be reduced, so that the light extraction efficiency of the light-emitting module 100 is improved. When the light source light-transmissive member 22 of the light source unit 20 includes a phosphor, light returning to the light source unit 20 can be reduced, so that it is possible to inhibit a wavelength of the light from the light source unit 20 from being excessively converted by the phosphor included in the light source light-transmissive member 22. The maximum length L1 of the first reflector 41B in the lateral direction (X direction and/or Y direction) is not particularly limited. For example, the maximum length L1 of the first reflector 41B in the lateral direction (X direction and/or Y direction) is twice or more the maximum length L2 of the first reflector 41B in the vertical direction (Z direction).

The first reflective member 40 preferably includes a plurality of second through holes 40H. The plurality of second through holes 40H penetrate from the upper surface to the lower surface of the first reflective member 40. Since the first reflective member 40 includes the plurality of second through holes 40H, luminance in a region directly above the first reflective member 40 is easily adjusted. For example, by changing the size and position of the second through hole 40H, the light from the light source unit 20 blocked by the first reflective member 40 can be adjusted. This makes it easy to adjust the luminance in the region directly above the first reflective member 40, thereby making it easy to reduce luminance unevenness in the light-emitting module 100. In the plan view, all of the plurality of second through holes 40H are preferably located apart from the light source unit 20. This makes it possible to inhibit a region directly above the light source unit 20 from becoming too bright.

In the cross-sectional view, the side surface of the first reflective member 40 defining the second through holes 40H is preferably inclined so that the length of the second through holes 40H in the lateral direction becomes longer from the lower surface side of the first reflective member 40 toward the upper surface side of the first reflective member 40. By doing so, the light from the light source unit 20 is easily extracted upward. Note that in the cross-sectional view, the side surface of the first reflective member 40 defining the second through holes 40H may be inclined so that the length of the second through holes 40H in the lateral direction becomes shorter from the lower surface side of the first reflective member 40 toward the upper surface side of the first reflective member 40. Note that in the cross-sectional view, the side surface of the first reflective member 40 defining the second through holes 40H may not be inclined.

In the cross-sectional view, the side surface of the first reflective member 40 defining the second through holes 40H preferably has a convex portion or a recessed portion. For example, by changing the size and position of the convex portion or the recessed portion provided on the side surface of the first reflective member 40 defining the second through holes 40H, the light from the light source unit 20 blocked by the first reflective member 40 can be adjusted. This makes it easy to adjust luminance, so it is easy to reduce luminance unevenness in the light-emitting module 100.

The first reflective member 40 preferably has a convex portion 40A (hereinafter, referred to as a first convex reflective portion) extending upward around the second through hole 40H. The first convex reflective portion 40A is provided on an upper surface side of the first reflective member 40. When an optical sheet such as a prism sheet or a light diffusion sheet is provided above the light-emitting module 100, even though the first convex reflective portion 40A and the optical sheet are in contact with each other, the layer of air is easily disposed between the first reflective member 40 and the optical sheet. The light from the light source unit 20 is reflected or refracted by the layer of air between the first reflective member 40 and the optical sheet, so that the light is easily spread to a region far from the light source unit 20. This makes it possible to reduce luminance unevenness in the light-emitting module. The first reflective member 40 may include a convex portion (hereinafter, referred to as a second convex reflective portion) extending downward around the second through hole 40H. The second convex reflective portion is provided on a lower surface side of the first reflective member 40. Since the first reflective member 40 includes the second convex reflective portion, it becomes easy to increase an area where an adhesive member 45 described below and the first reflective member 40 are in contact with each other. This makes it possible to improve the adhesion between the adhesive member 45 and the first reflective member 40.

In the plan view, the first reflective member 40 preferably includes a plurality of recessed portions 40B (hereinafter, referred to as first recessed reflective portions) recessed in the lateral direction. The first recessed reflective portions 40B are provided on the outer edge of the first reflective member 40. Since the first reflective member 40 includes the first recessed reflective portions 40B, it becomes easy to adjust luminance around the first reflective member 40. For example, by changing the size and position of the first recessed reflective portion 40B, it is possible to adjust the light from the light source unit 20 blocked by the first reflective member 40. This makes it easy to adjust luminance around the first reflective member 40, thereby making it easy to reduce luminance unevenness in the light-emitting module 100. Further, since the first reflective member 40 includes the plurality of first recessed reflective portions 40B, a high-luminance portion and a low-luminance portion are likely to be scattered in the vicinity of the outer edge of the first reflective member 40. As a result, in the vicinity of the outer edge of the first reflective member 40, the boundary between the luminance of a portion located inside the outer edge of the first reflective member 40 and the luminance of a portion located outside the outer edge of the first reflective member 40 can be made inconspicuous. The size of the first recessed reflective portion 40B is not particularly limited. A maximum length of the first recessed reflective portion 40B in the first direction may be longer than a maximum length of the second through hole 40H in the first direction. A maximum length of the first recessed reflective portion 40B in the second direction may be longer than a maximum length of the second through hole 40H in the second direction.

As illustrated in FIG. 1, in the plan view, the outer edge of the first reflective member 40 is preferably located inside the outer edge of the first through hole 10H of the light guide member 10. By doing so, in the plan view, it becomes easy to increase the area of the first light-transmissive member 30 exposed from the first reflective member 40. This makes it easy to extract light from the light source unit 20 upward from the upper surface of the first light-transmissive member 30. Like a planar light source 301 illustrated in FIG. 5, in the plan view, the outer edge of the first reflective member 40 may be located outside the outer edge of the first through hole 10H of the light guide member 10. By doing so, the outer edge of the first through hole 10H of the light guide member 10 is covered with the first reflective member 40. This makes it possible to inhibit the vicinity of the outer edge of the first through hole 10H from becoming too bright, thereby making it easy to reduce luminance unevenness in the light-emitting module 100. Note that, like a planar light source 302 illustrated in FIG. 7, in the plan view, the outer edge of the first reflective member 40 may include a portion located inside the outer edge of the first through hole 10H of the light guide member 10, and a portion located outside the outer edge of the first through hole 10H of the light guide member 10.

Examples of the material of the first resin member 41A include a polyethylene terephthalate (PET) resin, an olefin resin, an acrylic resin, a silicone resin, a urethane resin, or an epoxy resin. An examples of the first reflector 41B includes a gas such as air. Other examples of the material of the first reflector 41B include particles such as silicon dioxide, calcium fluoride, and magnesium fluoride. Note that the first reflective member 40 may or may not include a reflector having a refractive index higher than a refractive index of the first resin member 41A. Since the first reflective member 40 includes a reflector having a refractive index higher than the refractive index of the first resin member 41A, it is possible to further inhibit a region directly above the light source unit 20 from becoming too bright.

Figure 6:
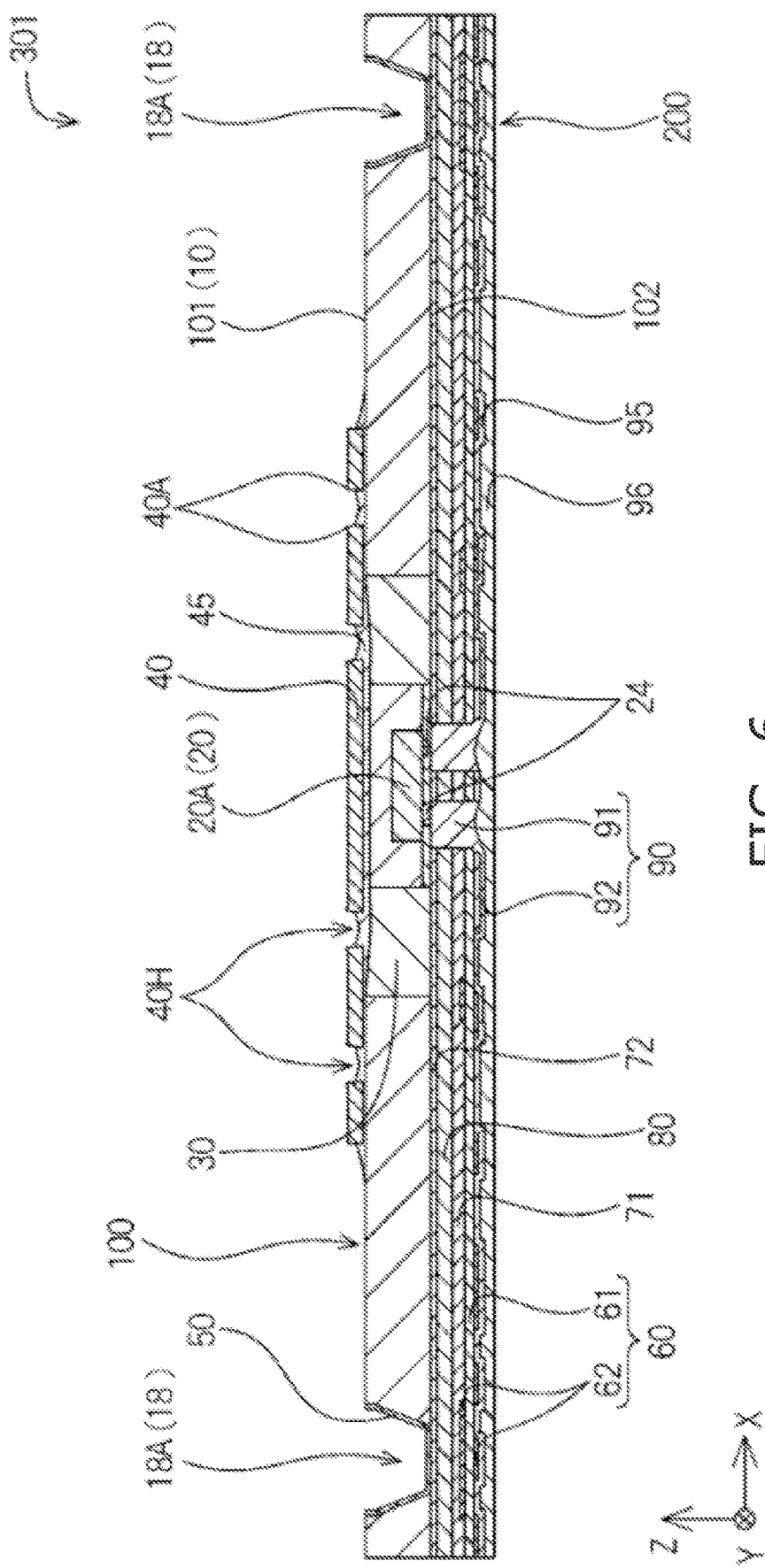
FIG. 6 is a schematic cross-sectional view taken along line VI-VI in FIG. 5.
Figure 7:
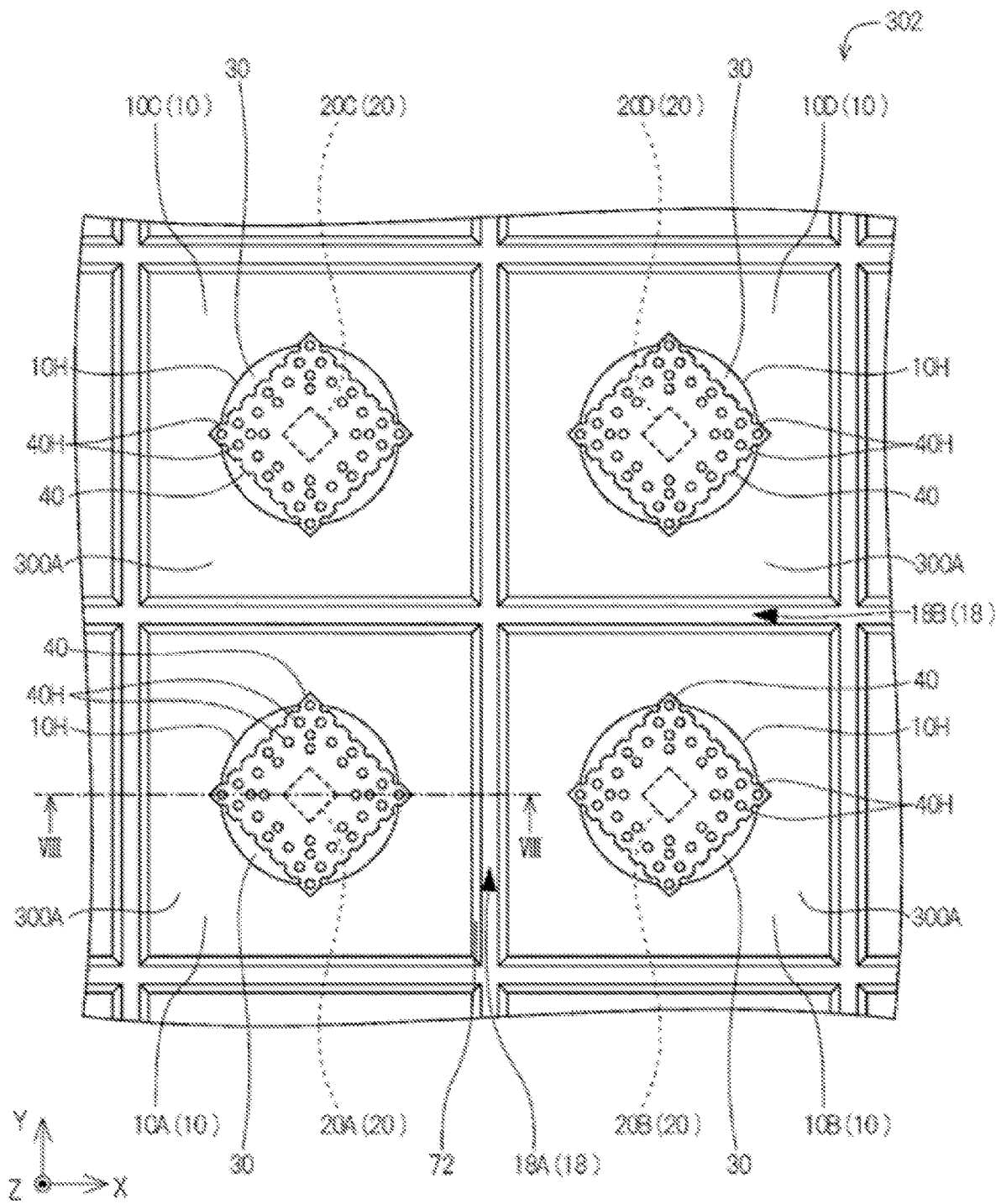
FIG. 7 is a schematic plan view of a modification of the exemplary planar light source according to the exemplary embodiment.
Figure 8:
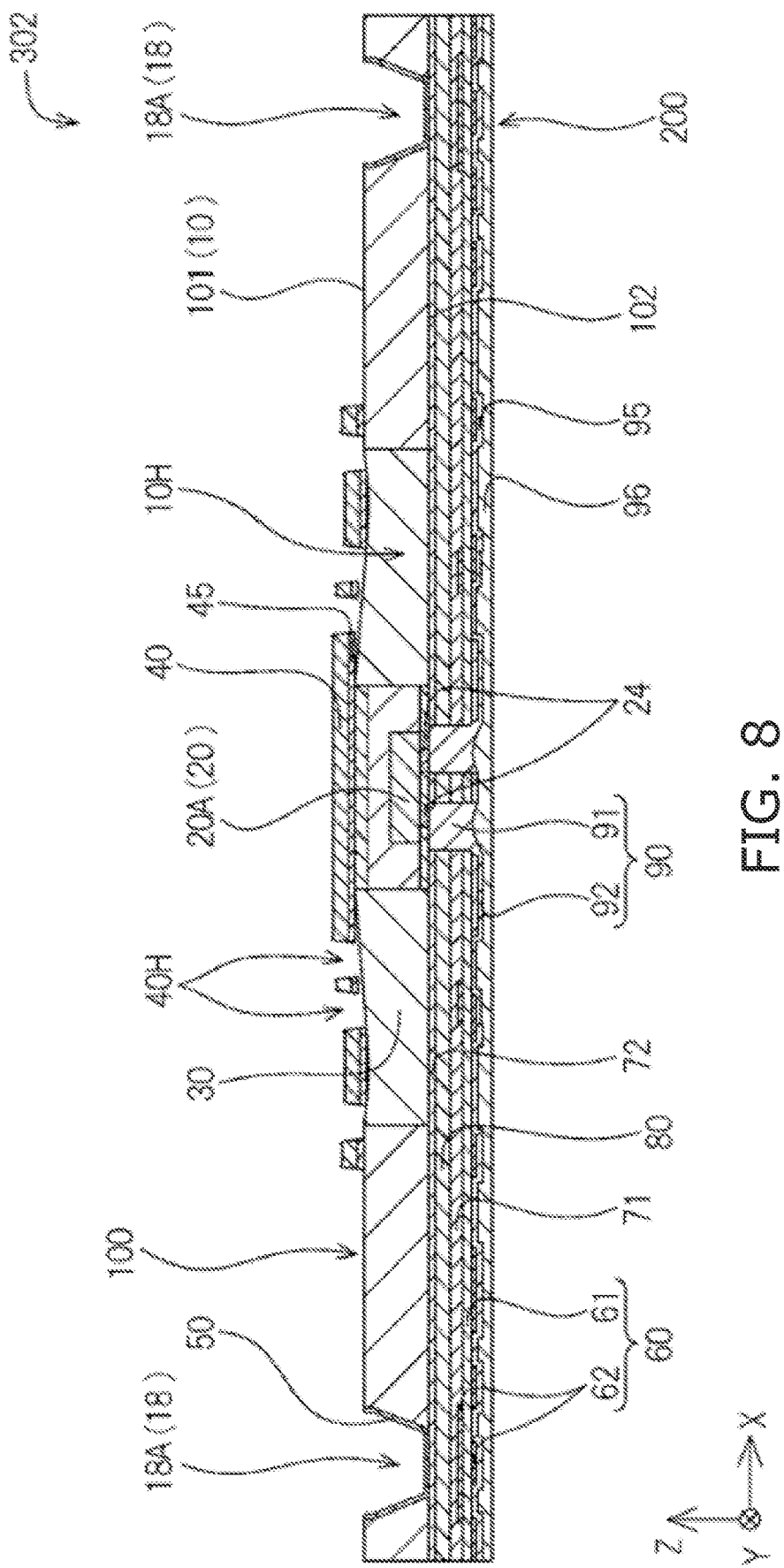
FIG. 8 is a schematic cross-sectional view taken along line VIII-VIII in FIG. 7.

As illustrated in FIGS. 2, 6, and 8, the light source unit 20 and the first reflective member 40 can be fixed by disposing the adhesive member 45 that is light-transmissive between the light source unit 20 and the first reflective member 40. In the present specification, the adhesive member 45 may be referred to as a second light-transmissive member. The first light-transmissive member 30 and the first reflective member 40 can be fixed by disposing the light-transmissive adhesive member 45 between the first light-transmissive member 30 and the first reflective member 40. Examples of the material of the adhesive member 45 that can be used include a thermoplastic resin such as an acrylic resin, a polycarbonate resin, a cyclic polyolefin resin, a polyethylene terephthalate resin, or a polyester resin, or a thermosetting resin such as an epoxy resin or a silicone resin. Examples of the adhesive member 45 may be used include an optically clear adhesive (OCA) having a sheet shape. Note that when the first reflective member 40 has adhesiveness, the light source unit 20 and the first reflective member 40 may be fixed in contact with each other.

In the plan view, the adhesive member 45 preferably overlaps the second through hole 40H of the first reflective member 40. That is, as illustrated in FIGS. 2 and 6, the adhesive member 45 is preferably located on the lower side of the second through hole 40H of the first reflective member 40. As a result, light escaping from the second through hole 40H can be adjusted by the adhesive member 45, so that it becomes easy to reduce luminance unevenness in the light-emitting module 100.

The adhesive member 45 is preferably in contact with at least a part of the side surface of the first reflective member 40. By doing so, the adhesion between the adhesive member 45 and the first reflective member 40 is improved. The adhesive member 45 is preferably in contact with at least a part of the side surface of the first reflective member 40 that defines the second through hole 40H. By doing so, the adhesion between the adhesive member 45 and the first reflective member 40 is improved.

The adhesive member 45 may include a through hole. In the plan view, the through hole of the adhesive member 45 may overlap the second through hole 40H of the first reflective member 40. That is, as illustrated in FIG. 8, a portion where the adhesive member 45 is not located may exist on the lower side of the second through hole 40H of the first reflective member 40. By doing so, light easily escapes from the second through hole 40H, so that the light extraction efficiency of the light-emitting module 100 is improved.

Second Reflective Member 50

As illustrated in FIG. 2, the light-emitting module 100 may further include the second light reflective member 50. The second light reflective member 50 is a member having reflectivity with respect to the light emitted by the light source unit 20. A reflectivity of the second light reflective member 50 is preferably, for example, 60% or more, more preferably 80% or more.

The second reflective member 50 is disposed in the partition groove 18. In the present embodiment, the second reflective member 50 is disposed in a layered manner along the inner surface of the partition groove 18. The second reflective member 50 may be constituted by a single layer or may be constituted by a layered body of a plurality of layers. The second reflective member 50 may also be filled in the partition groove 18. The second reflective member 50 is disposed in the partition groove 18. For example, light guide from a light-emitting region in a light-emitting state to a light-emitting region in a non-light-emitting state is limited by the second reflective member 50. This makes it possible to improve a contrast ratio between the light-emitting region in the light-emitting state to the light-emitting region in the non-light-emitting state. Note that the light-emitting module 100 may not include the second reflective member 50.

The second reflective member 50 is consisting essentially of a second resin member and a second reflector included in the second resin member. Examples of the second resin member that can be used include a thermoplastic resin such as an acrylic resin, a polycarbonate resin, a cyclic polyolefin resin, a polyethylene terephthalate resin, or a polyester resin, or a thermosetting resin such as an epoxy resin or a silicone resin. Examples of the second reflector that can be used include particles such as titania, silica, alumina, zinc oxide, magnesium oxide, zirconia, yttria, calcium fluoride, magnesium fluoride, niobium pentoxide, barium titanate, tantalum pentoxide, barium sulfate, or glass. The second reflective member 50 may be, for example, a metal member such as aluminum or silver, or a dielectric multilayer film.

Support Member 200

The support member 200 is a member on which the light-emitting module 100 is disposed. The support member 200 supports the light guide member 10 and the light source unit 20. The light guide member 10 is disposed on the support member 200 with the second surface 102 facing an upper surface of the support member 200.

The support member 200 includes a wiring substrate 60. The wiring substrate 60 includes an insulating base material 61, and at least one layer of wiring layer 62 disposed on at least one surface of the insulating base material 61. The insulating base material 61 may be a rigid substrate, or may be a flexible substrate. The insulating base material 61 is preferably a flexible substrate in order to reduce the thickness of the planar light source. The insulating base material 61 may be constituted by a single layer or may be constituted by a layered body of a plurality of layers in the third direction (Z direction). For example, the insulating base material 61 may be formed of a single-layer flexible substrate, or may be formed of a layered body of a plurality of rigid substrates. An example of a material of the insulating base material 61 that can be used includes a resin such as a polyimide. The wiring layer 62 is a metal film, for example, a copper film.

The support member 200 further includes a first adhesive layer 71 disposed on the wiring substrate 60, a third reflective member 80 disposed on the first adhesive layer 71, and a second adhesive layer 72 disposed on the third reflective member 80.

The first adhesive layer 71 is disposed between the insulating base material 61 and the third reflective member 80, and adheres the insulating base material 61 and the third reflective member 80. The first adhesive layer 71 is, for example, a resin layer including light scattering particles. Examples of the resin of the first adhesive layer 71 that can be used include a thermoplastic resin such as an acrylic resin, a polycarbonate resin, a cyclic polyolefin resin, a polyethylene terephthalate resin, or a polyester resin, or a thermosetting resin such as an epoxy resin or a silicone resin. Examples of the light scattering particles of the first adhesive layer 71 that can be used include particles such as titania, silica, alumina, zinc oxide, magnesium oxide, zirconia, yttria, calcium fluoride, magnesium fluoride, niobium pentoxide, barium titanate, tantalum pentoxide, barium sulfate, or glass.

The refractive index of the resin of the first adhesive layer 71 is preferably lower than the refractive index of the resin of the third reflective member 80. By doing so, a part of light traveling from the third reflective member 80 to the first adhesive layer 71 is totally reflected at an interface between the third reflective member 80 and the first adhesive layer 71. As a result, light escaping below the light-emitting module 100 can be suppressed, so that the light extraction efficiency of the light-emitting module 100 is improved.

The third reflective member 80 is disposed below the second surface 102 of the light guide member 10, below the light source unit 20, below the first light-transmissive member 30, and below the partition groove 18. The third reflective member 80 has reflectivity to the light emitted by the light source unit 20. The third reflective member 80 is consisting essentially of a third resin member and a third reflector included in the third resin member. Examples of materials of the third reflective member 80 include a polyethylene terephthalate (PET) resin, an olefin resin, an acrylic resin, a silicone resin, a urethane resin, or an epoxy resin. Examples of the third reflector include a gas such as air. Other examples of materials of the third reflector include particles such as silicon dioxide, calcium fluoride, or magnesium fluoride.

A refractive index of the third reflector is preferably lower than a refractive index of the third resin member. By doing so, a part of light from the light source unit 20 incident on the third resin member is totally reflected at an interface between the third resin member and the third reflector. This makes it possible to suppress light from escaping downward from the third reflective member 80, so that the light extraction efficiency of the light-emitting module 100 is improved.

The refractive index of the third resin member is preferably higher than the refractive index of the base material of the first light-transmissive member 30. By doing so, it becomes easy to increase the difference in refractive index between the third resin member and the third reflector. As a result, a part of the light from the light source unit 20 incident on the third resin member is likely to be totally reflected at the interface between the third resin member and the third reflector.

The second adhesive layer 72 is disposed between the third reflective member 80 and the second surface 102 of the light guide member 10, and adheres the third reflective member 80 and the light guide member 10. The light source unit 20 is disposed on the second adhesive layer 72 in the first through hole 10H of the light guide member 10. The material of the second adhesive layer 72 can be selected from, for example, resins listed as resins that can be used for the first adhesive layer 71 described above. The second adhesive layer 72 may include light scattering particles, and the light scattering particles can be selected from, for example, light scattering particles listed as light scattering particles that can be used for the first adhesive layer 71 described above.

The refractive index of the resin of the second adhesive layer 72 is preferably lower than the refractive index of the base material of the light guide member 10. By doing so, a part of light traveling from the light guide member 10 to the second adhesive layer 72 is totally reflected at an interface between the light guide member 10 and the second adhesive layer 72. As a result, light escaping below the light-emitting module 100 can be suppressed, so that the light extraction efficiency of the light-emitting module 100 is improved. The refractive index of the resin of the second adhesive layer 72 is preferably lower than the refractive index of the first light-transmissive member 30. By doing so, a part of light traveling from the first light-transmissive member 30 to the second adhesive layer 72 is totally reflected at an interface between the first light-transmissive member 30 and the second adhesive layer 72. As a result, light escaping below the light-emitting module 100 can be suppressed, so that the light extraction efficiency of the light-emitting module 100 is improved.

The support member 200 further includes the conductive member 90. The conductive member 90 is consisting essentially of, for example, resin and metal particles included in the resin. Examples of the resin of the conductive member 90 that can be used include an epoxy resin or a phenol resin. Examples of particles of copper or silver that can be used include the metal particles.

The conductive member 90 includes a connection portion 91 and a wiring portion 92. The connection portion 91 penetrates the second adhesive layer 72, the third reflective member 80, the first adhesive layer 71, and the insulating base material 61 in the third direction (Z direction). The wiring portion 92 is disposed on a surface of the wiring substrate 60 on which the wiring layer 62 is disposed, and is connected to the connection portion 91. The connection portion 91 and the wiring portion 92 can be integrally formed of the same material, for example. A portion of the wiring portion 92 is connected to the wiring layer 62.

A pair of conductive members 90 are disposed apart from each other corresponding to the pair of positive and negative electrodes 24 of the light source unit 20. The connection portion 91 of one of the conductive members 90 is connected to the positive electrode 24 below the light source unit 20, and the connection portion 91 of the other conductive member 90 is connected to the negative electrode 24 below the light source unit 20. The electrode 24 of the light source unit 20 is electrically connected to the conductive member 90 and the wiring layer 62.

The support member 200 further includes a first insulating layer 95. The first insulating layer 95 is disposed on a lower surface of the wiring substrate 60, and covers the wiring layer 62. Examples of the material of the first insulating layer 95 that can be used include an epoxy resin, a urethane resin, or an acrylic resin.

The support member 200 further includes a second insulating layer 96. The second insulating layer 96 is disposed on a lower surface of the conductive member 90, and covers the conductive member 90. Examples of the material of the second insulating layer 96 that can be used include an epoxy resin, a urethane resin, or an acrylic resin.

Figure 9:
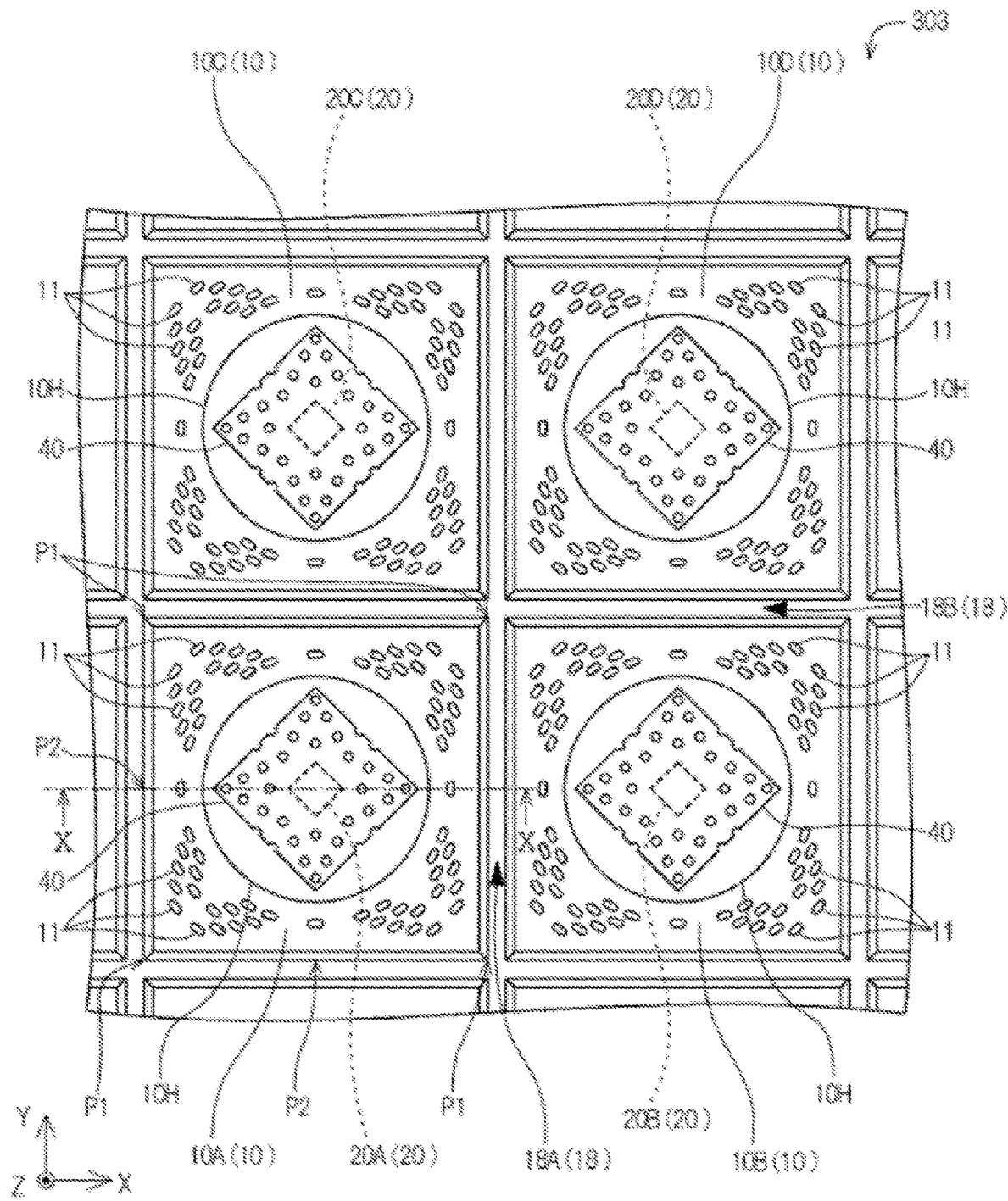
FIG. 9 is a schematic plan view of a modification of the exemplary planar light source according to the exemplary embodiment.
Figure 10:
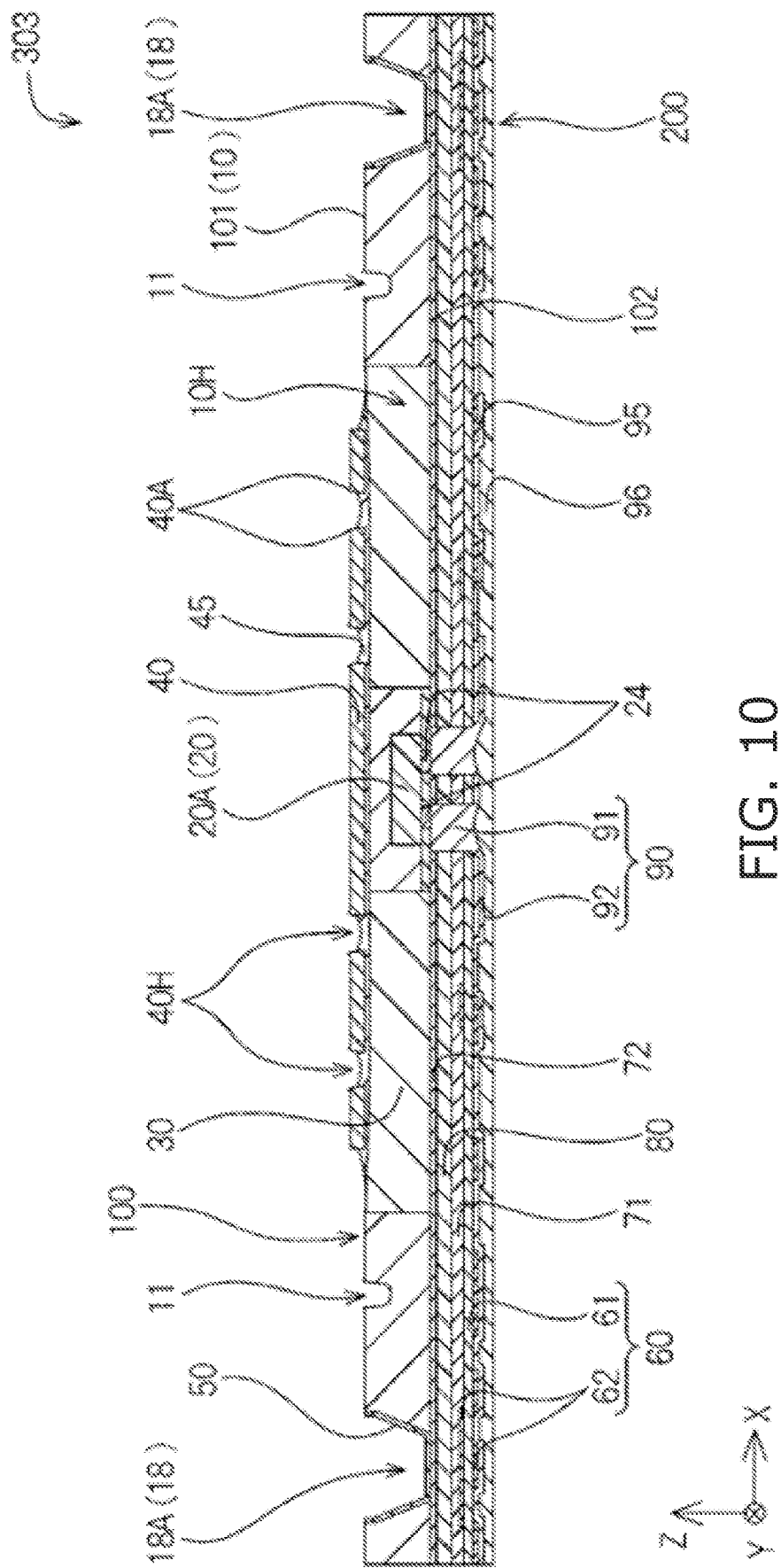
FIG. 10 is a schematic cross-sectional view taken along line X-X in FIG. 9.

A modification of the light guide member 10 is described with reference to FIGS. 9 to 15. Like a planar light source 303 illustrated in FIG. 9, the light guide member 10 may include light guide hole portions 11. In the plan view, the light guide hole portions 11 are located between the first through hole 10H and the partition groove 18. As illustrated in FIG. 10, the light guide hole portion 11 is a recessed portion that opens only on the first surface 101 side of the light guide member 10. The light guide hole portion 11 may penetrate from the first surface 101 to the second surface 102 of the light guide member 10, or may be a recessed portion that opens only on the second surface 102 side of the light guide member 10. Since the light guide member 10 includes the light guide hole portions 11, a surface area of the light guide member 10 can be increased. By doing so, it is possible to increase the amount of light extracted from the surface of the light guide member 10 to the outside of the light guide member 10. This makes it easy to adjust luminance, so it is easy to reduce luminance unevenness in the light-emitting module 100. Note that when the light guide hole portion 11 is a recessed portion, the depth of the recessed portion in the Z direction is 0.1 times or more the thickness of the light guide member 10.

As illustrated in FIG. 10, in the lateral direction (X direction and/or Y direction), at least some of the light guide hole portions 11 preferably overlap the light source unit 20. By doing so, at least a part of light traveling in the lateral direction from the light source unit 20 is converted to light that is refracted on a surface of the light guide hole portion 11 and travels in the upward direction. As a consequence, the amount of light extracted upward can be increased. This makes it easy to adjust luminance, so it is easy to reduce luminance unevenness in the light-emitting module 100.

Figure 11:
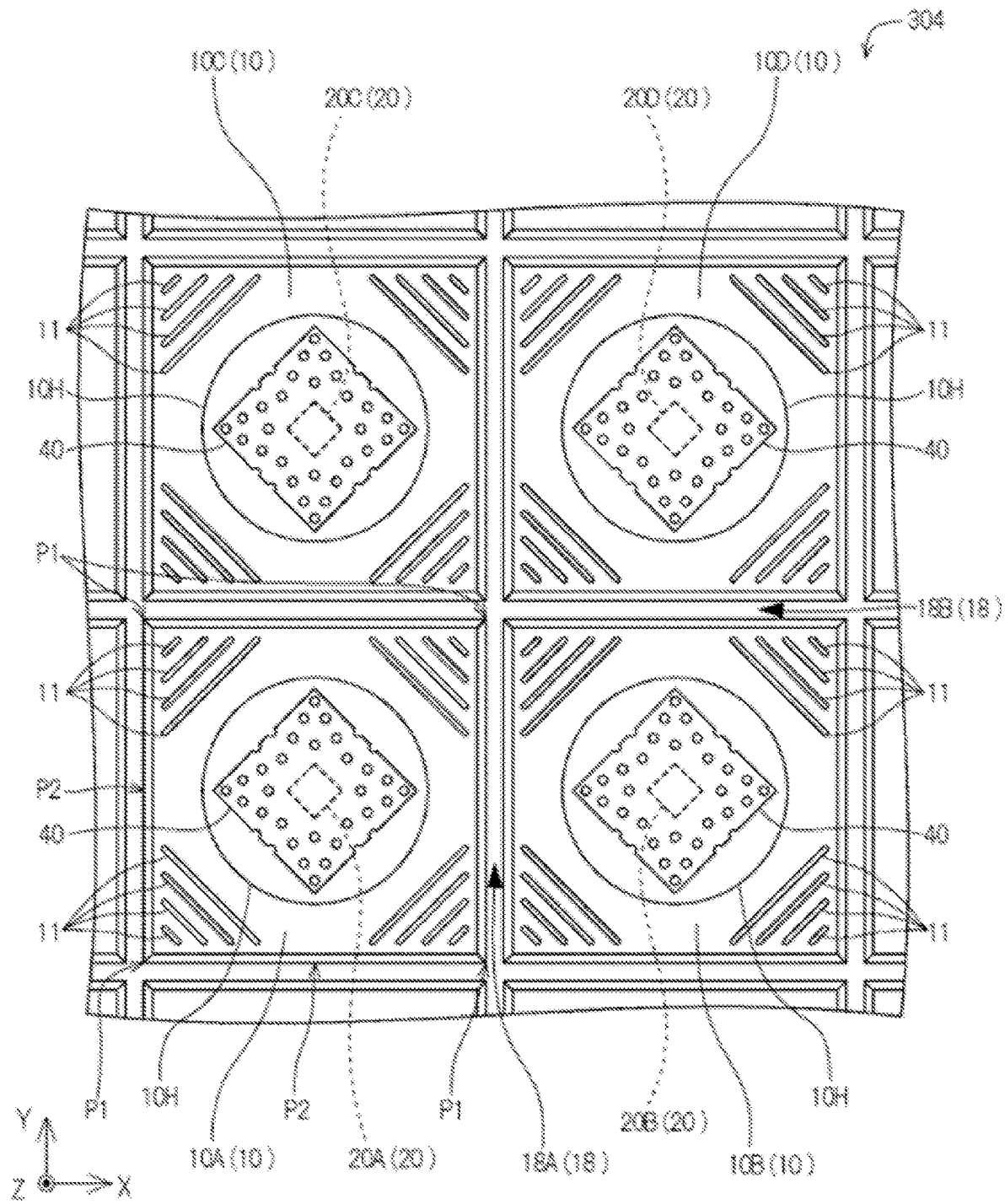
FIG. 11 is a schematic plan view of a modification of the exemplary planar light source according to the exemplary embodiment.
Figure 12:
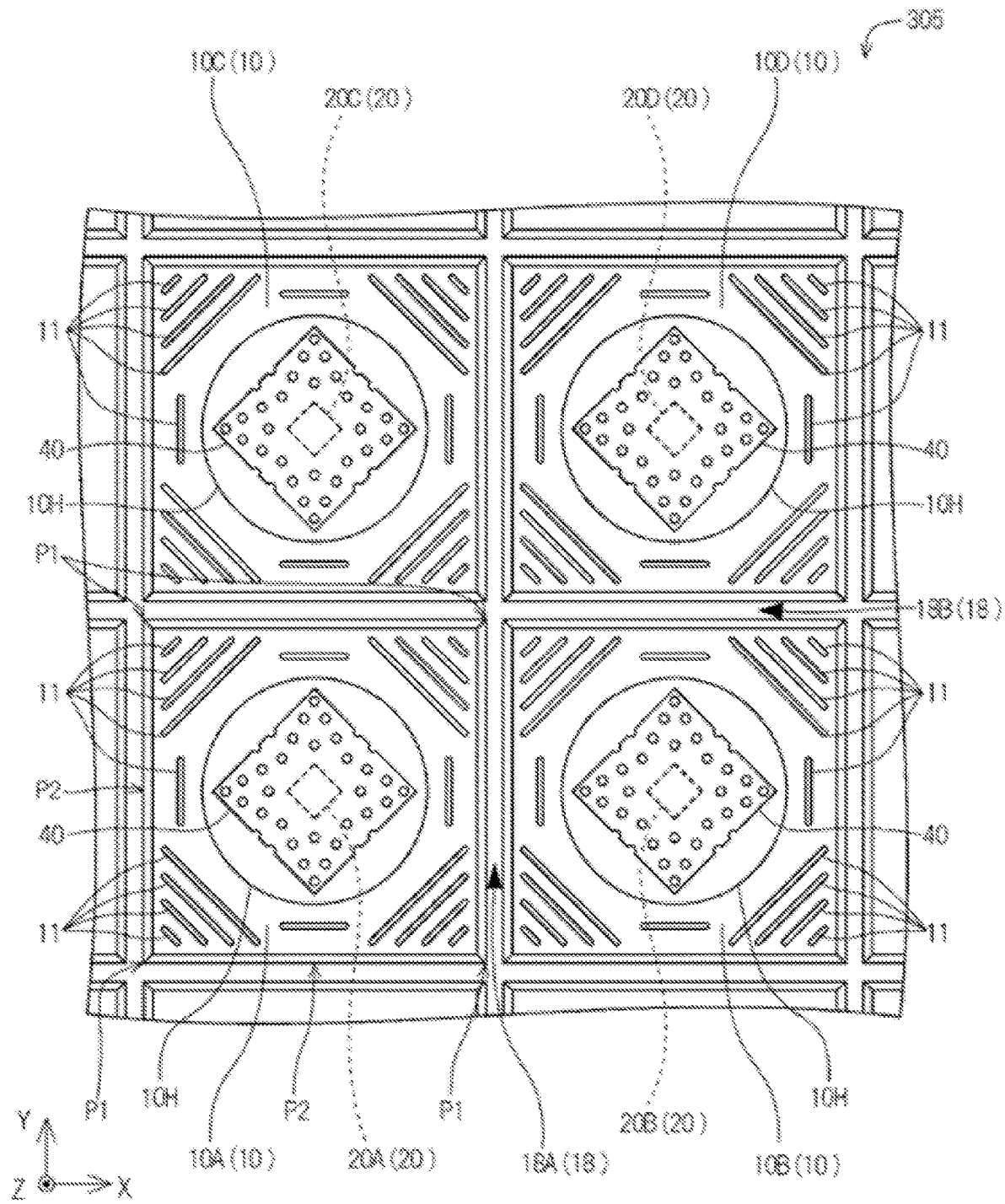
FIG. 12 is a schematic plan view of a modification of the exemplary planar light source according to the exemplary embodiment.

A shape of the light guide hole portion 11 in the plan view is not particularly limited. As illustrated in FIGS. 9, 11, and 12, the light guide hole portion 11 of the present embodiment has a shape extending in one direction. In the plan view, the shape of the light guide hole portion 11 may be a V-shape or an L-shape extending in two directions. In the plan view, the shape of the light guide hole portion 11 may be a circle, an ellipse, or a polygon such as a triangle, a quadrangle, a hexagon, or an octagon.

A point farthest from the first light source 20A in an outer edge of the first light guide portion 10A located on the second surface 102 is referred to as a first point P1, and a point closest to the first light source 20A in the outer edge of the first light guide portion 10A located on the second surface 102 is referred to as s second point P2. In the present embodiment, the first point P1 is located at the corner of the first light guide portion 10A, and the second point P2 is located at the center of each side of the first light guide portion 10A. The first point P1 and the second point P2 may each be one or plural.

Like a planar light source 304 illustrated in FIG. 11, in the plan view, the light guide hole portions 11 are preferably located on a first virtual straight line connecting the center of the first light source 20A and the first point P1. By doing so, luminance unevenness in the light-emitting module is reduced. The first point P1 farther from the first light source 20A is more likely to have a lower luminance than the second point P2 close to the first light source 20A, but the light guide hole portions 11 are located on the first virtual straight line, so that the amount of light extracted to the outside of the light guide member 10 in the vicinity of the first point P1 is likely to be increased. As a result, the difference between luminance at the first point P1 and luminance at the second point P2 can be suppressed, so that luminance unevenness in the light-emitting module is reduced. Note that, as illustrated in FIG. 9, in the plan view, the light guide hole portions 11 may not be located on the first virtual straight line connecting the center of the first light source 20A and the first point P1.

As illustrated in FIG. 11, a plurality of light guide hole portions 11 are preferably located on the first virtual straight line. By doing so, it becomes easy to adjust luminance in the vicinity of the first point P1, so that it is easy to reduce luminance unevenness in the light-emitting module.

Like a planar light source 305 illustrated in FIG. 12, in the plan view, the light guide hole portion 11 may be located on a second virtual straight line connecting the center of the first light source 20A and the second point P2. In the plan view, the shortest length from one point of the light guide hole portion 11 located on the first virtual straight line to the center of the first light source 20A is preferably greater than the shortest length from one point of the light guide hole portion 11 located on the second virtual straight line to the center of the first light source 20A. By doing so, the light guide hole portions 11 located on the first virtual straight line are likely to be located in the vicinity of the first point P1. This makes it easy to increase light extracted outside the light guide member 10 in the vicinity of the first point P1. In the present specification, it is assumed that, when the plurality of light guide hole portions 11 are located on the first virtual straight line, the shortest length from one point of the light guide hole portions 11 located on the first virtual straight line to the center of the first light source 20A is a length obtained when the length from one point of the light guide hole portion 11 located on the first virtual straight line among the plurality of light guide hole portions 11 to the center of the first light source 20A is the shortest. It is assumed that, when the plurality of light guide hole portions 11 are located on the second virtual straight line, the shortest length from one point of the light guide hole portions 11 located on the second virtual straight line to the center of the first light source 20A is a length obtained when the length from one point of the light guide hole portion 11 located on the second virtual straight line among the plurality of light guide hole portions 11 to the center of the first light source 20A is the shortest.

The number of light guide hole portions 11 located on the second virtual straight line is preferably smaller than the number of light guide hole portions 11 located on the first virtual straight line. In the embodiment illustrated in FIG. 12, there is one light guide hole portion 11 located on the second virtual straight line, and four light guide hole portions 11 are located on the first virtual straight line. By doing so, it is possible to inhibit the vicinity of the second point P2 close to the first light source 20A from becoming too bright. As illustrated in FIG. 11, the light guide hole portion 11 may not be located on the second virtual straight line. By doing so, it is possible to inhibit the vicinity of the second point P2 close to the first light source 20A from becoming too bright.

Figure 13:
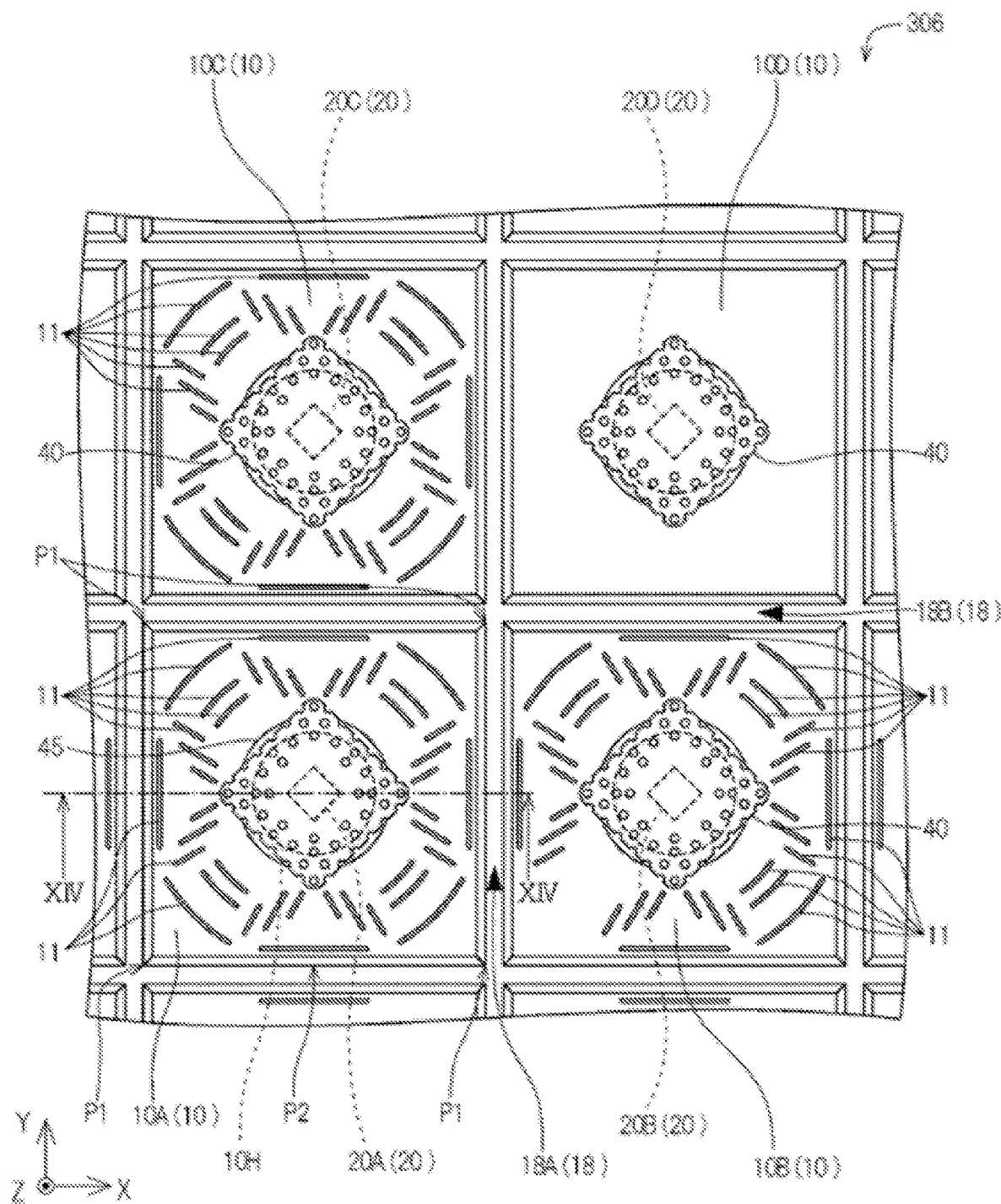
FIG. 13 is a schematic plan view of a modification of the exemplary planar light source according to the exemplary embodiment.

Like a planar light source 306 illustrated in FIG. 13, the light guide hole portion 11 may extend inclinedly in the first direction (X direction) and the second direction (Y direction) from the end portion of the light guide hole portion 11 close to the center of the first light source 20A so as to be apart from the first light source 20A. By doing so, a part of the light from the first light source unit 20A can be guided in the direction in which the light guide hole portion 11 extends. This makes it possible to reduce luminance unevenness in the light-emitting module.

Like the planar light source 306 illustrated in FIG. 13, the shape of the light guide hole portion 11 provided in the first light guide portion 10A and the shape of the light guide hole portion 11 provided in the second light guide portion 10B may be different from each other. For example, before the light guide hole portions 11 are formed in the light guide member 10, luminance unevenness in the first light guide portion 10A and luminance unevenness in the second light guide portion 10B are confirmed. After the luminance unevenness in the first light guide portion 10A and the luminance unevenness in the second light guide portion 10B are confirmed, the light guide hole portions 11 respectively suitable for the first light guide portion 10A and the second light guide portion 10B are formed in the light guide member 10. By doing so, it is possible to reduce luminance unevenness in the light-emitting module. For example, when the luminance unevenness is suppressed to a desired range before the light guide hole portions 11 are formed in the light guide member 10, no light guide hole portion 11 may be provided in the light guide member 10 as in the fourth light guide portion 10D of FIG. 13. According to a method of confirming the luminance unevenness in the first light guide portion 10A and the luminance unevenness in the second light guide portion 10B, for example, the luminance can be measured with a two-dimensional color luminance meter (CA-2500 manufactured by Konica Minolta).

Figure 14:
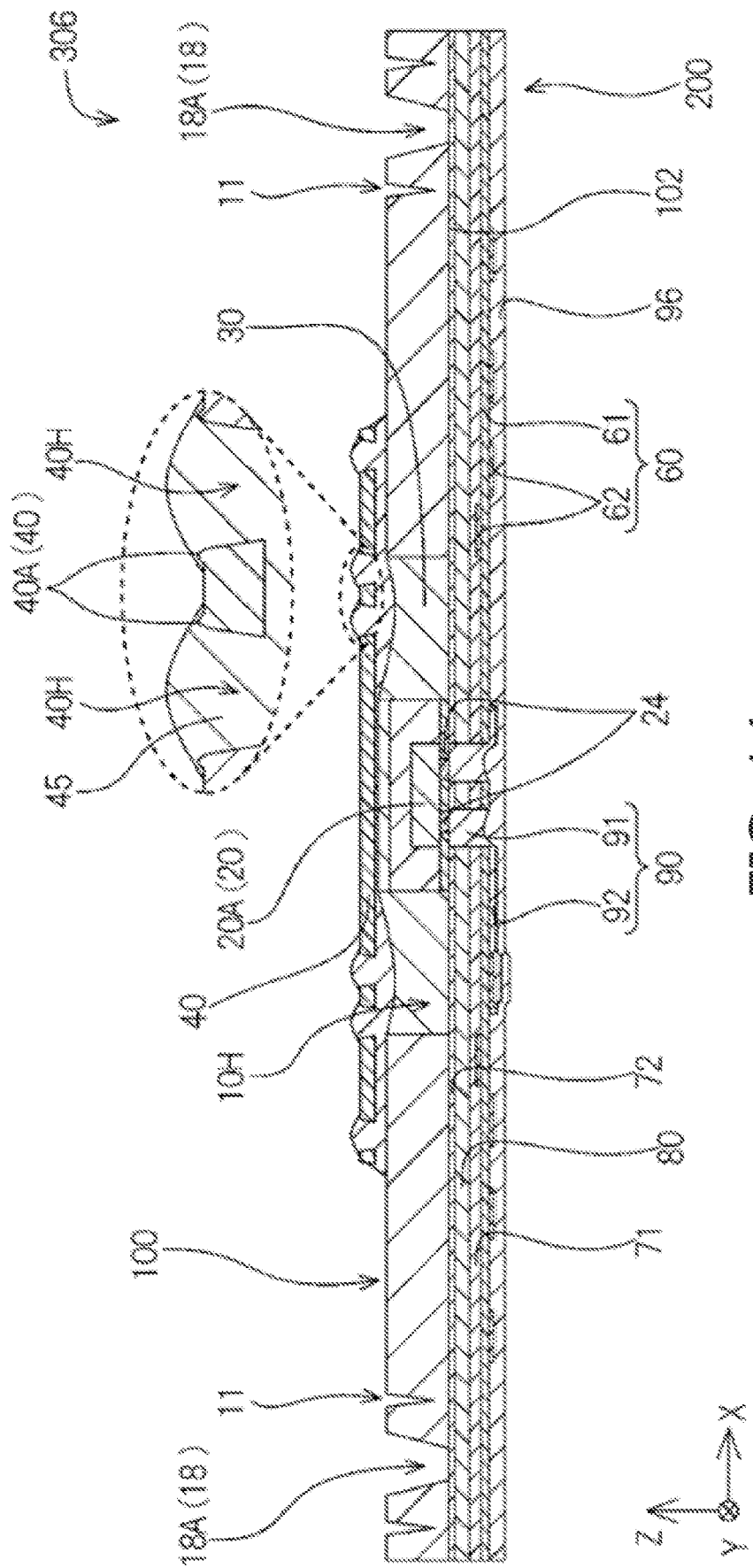
FIG. 14 is a schematic cross-sectional view taken along line XIV-XIV in FIG. 13.

As illustrated in FIG. 14, the second light-transmissive member 45 is located between the first light-transmissive member 30 and the first reflective member 40. The second light-transmissive member 45 is preferably in contact with at least a part of the side surface of the first reflective member 40 that defines the second through hole 40H. By doing so, the adhesion between the adhesive member 45 and the first reflective member 40 is improved.

As illustrated in FIG. 14, the second light-transmissive member 45 is preferably in contact with at least a part of the upper surface of the first reflective member 40. By doing so, the adhesion between the second light-transmissive member 45 and the first reflective member 40 is improved. It is preferable that the second light-transmissive member 45 continuously cover the side surface of the first reflective member 40, which defines the second through hole 40H, and the upper surface of the first reflective member 40. Since the second light-transmissive member 45 covers the upper surface of the first reflective member 40, the area of the second light-transmissive member 45 exposed from the first reflective member 40 can be increased in the plan view. A part of light passing through the second through hole 40H is extracted outward from the second light-transmissive member 45 having a large area in the plan view. This makes it easy to reduce the difference between luminance inside the second through hole 40H and luminance outside the second through hole 40H in the plan view.

As illustrated in FIG. 14, an upper surface of the second light-transmissive member 45 located above the second through hole 40H preferably includes a curved convex shape. By doing so, since the upper surface of the second light-transmissive member 45 serves as a lens, light from the light source unit is easily extracted. This improves the light extraction efficiency of the light-emitting module.

As illustrated in FIG. 14, the second light-transmissive member 45 is preferably in contact with the convex portion 40A of the first reflective member 40. By doing so, the adhesion between the second light-transmissive member 45 and the first reflective member 40 is improved. The second light-transmissive member 45 is preferably in contact with the outer surface of the first reflective member 40. By doing so, the adhesion between the second light-transmissive member 45 and the first reflective member 40 is improved.

Figure 15:
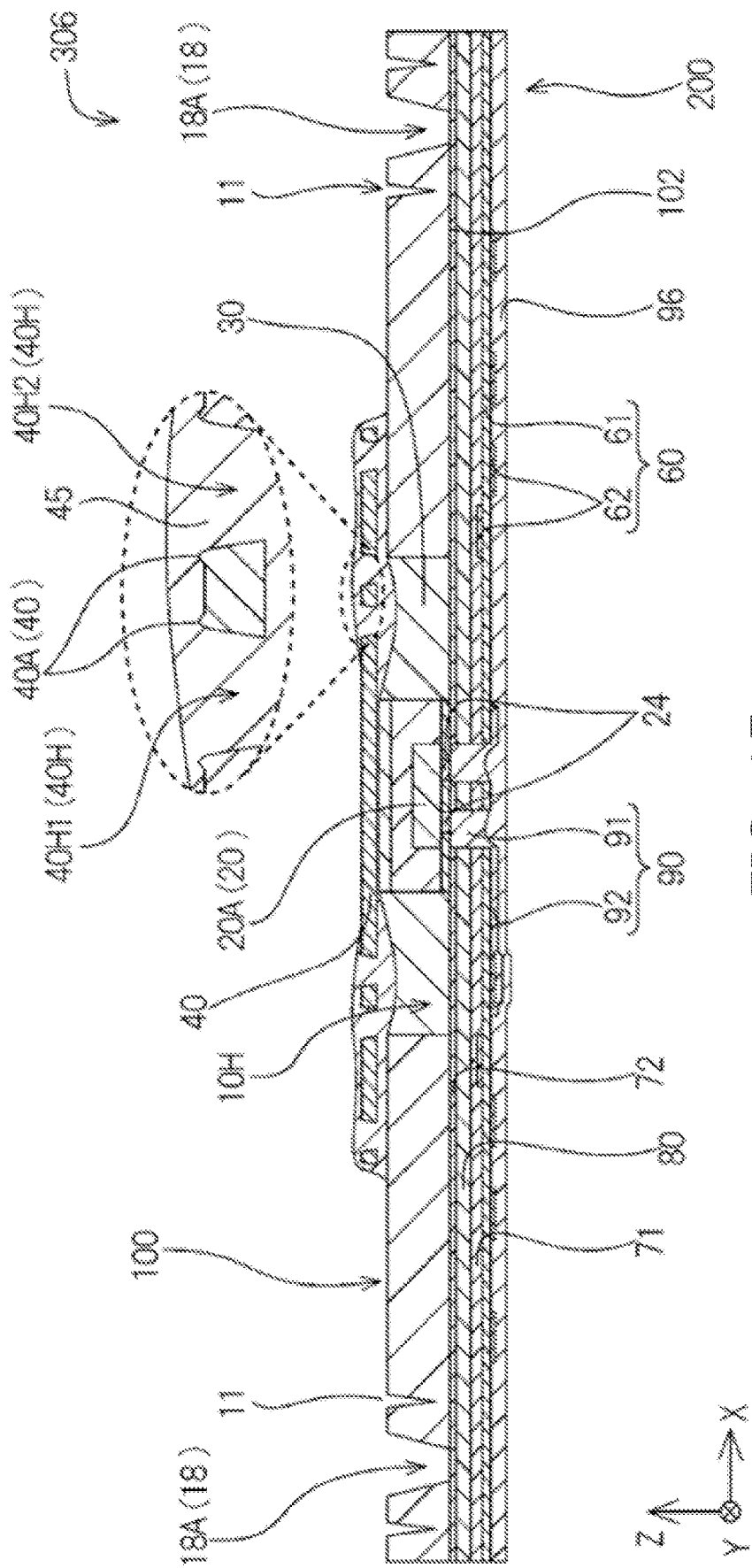
FIG. 15 is a schematic cross-sectional view of a modification of the exemplary planar light source according to the exemplary embodiment.

As illustrated in FIG. 15, the plurality of second through holes 40H include a third through hole 40H1 and a fourth through hole 40H2, which are adjacent to each other. In the cross-sectional view, it is preferable that the side surface of the first reflective member 40 that defines the third through hole 40H1, the upper surface of the first reflective member 40 located between the third through hole 40H1 and the fourth through hole 40H2, and the side surface of the first reflective member 40 that defines the fourth through hole 40H2 be continuously covered. By doing so, the adhesion between the second light-transmissive member 45 and the first reflective member 40 is improved. Since the upper surface of the first reflective member 40 is covered by the second light-transmissive member 45, the area of the second light-transmissive member 45 exposed from the first reflective member 40 can be increased in the plan view. A part of light passing through the third through hole 40H1 or the fourth through hole 40H2 is extracted outward from the second light-transmissive member 45 having a large area in the plan view. This makes it easy to reduce the difference between luminance inside the third through hole 40H1 and the fourth through hole 40H2 and luminance outside the third through hole 40H1 and the fourth through hole 40H2 in the plan view.

Figure 16:
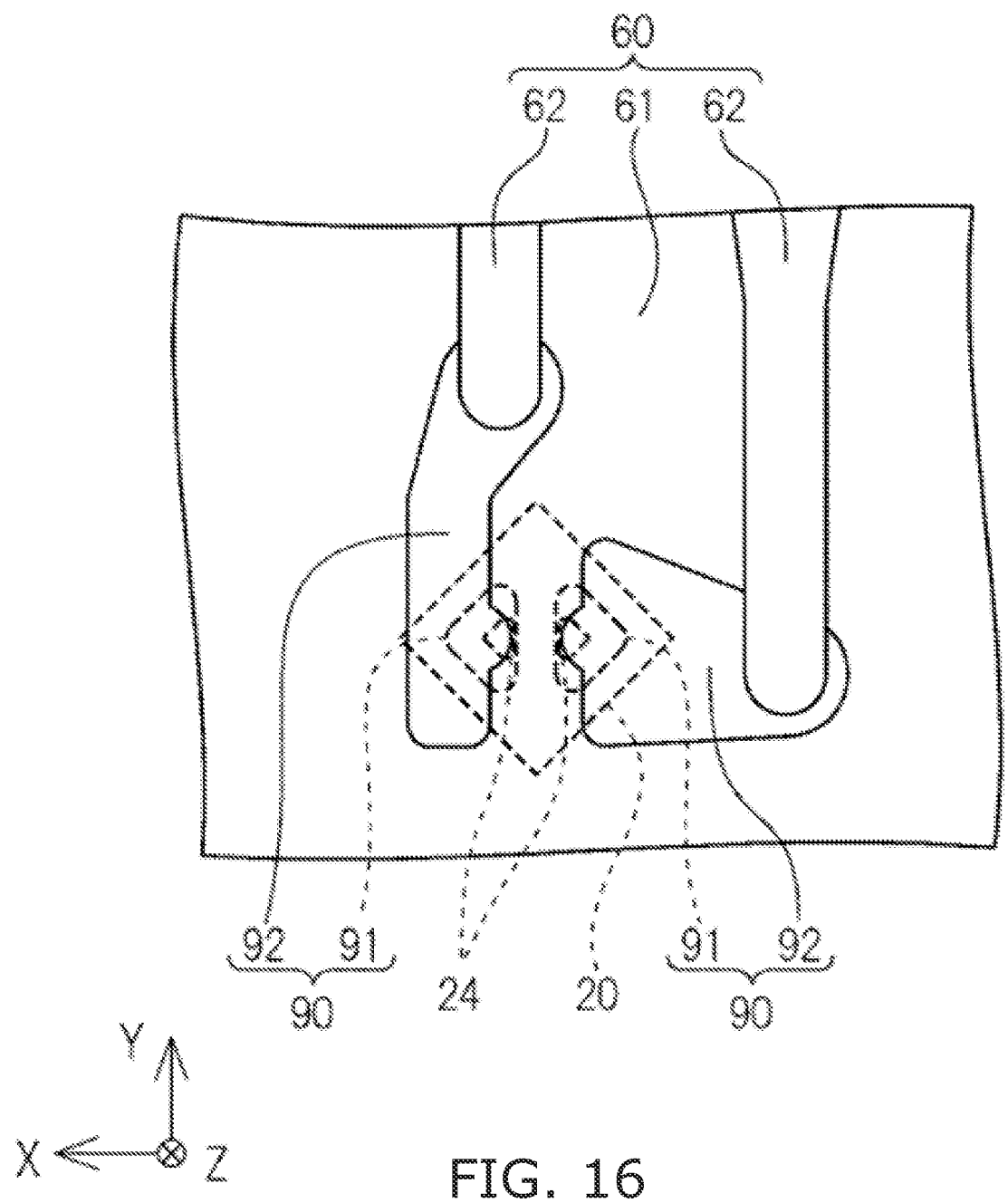
FIG. 16 is a schematic bottom view illustrating an example of a lower region of the exemplary light source unit in the exemplary planar light source according to the exemplary embodiment.

The shape of the connection portion 91 of the conductive member 90 in the bottom view is not particularly limited. As illustrated in FIG. 16, the shape of the connection portion 91 in the bottom view may be a triangle. In the bottom view, the shape of the connection portion 91 can be a polygon such as a circle, an ellipse, or a quadrangle. In the bottom view, a portion where the length from an outer edge of the electrode 24 of the light source unit 20 to an outer edge of the connection portion 91 is the shortest is preferably located between a pair of electrodes 24. By doing so, a pair of conductive members 90 disposed to correspond to the pair of electrodes 24 are easily inhibited from coming into contact with each other and being short-circuited. Between the pair of electrodes 24, the outer edge of the connecting portion 91 electrically connected to one of the pair of electrodes 24 and the outer edge of the connecting portion 91 electrically connected to the other of the pair of electrodes 24 are preferably parallel to each other. By doing so, the pair of conductive members 90 are easily inhibited from coming into contact with each other and being short-circuited.

Figure 17:
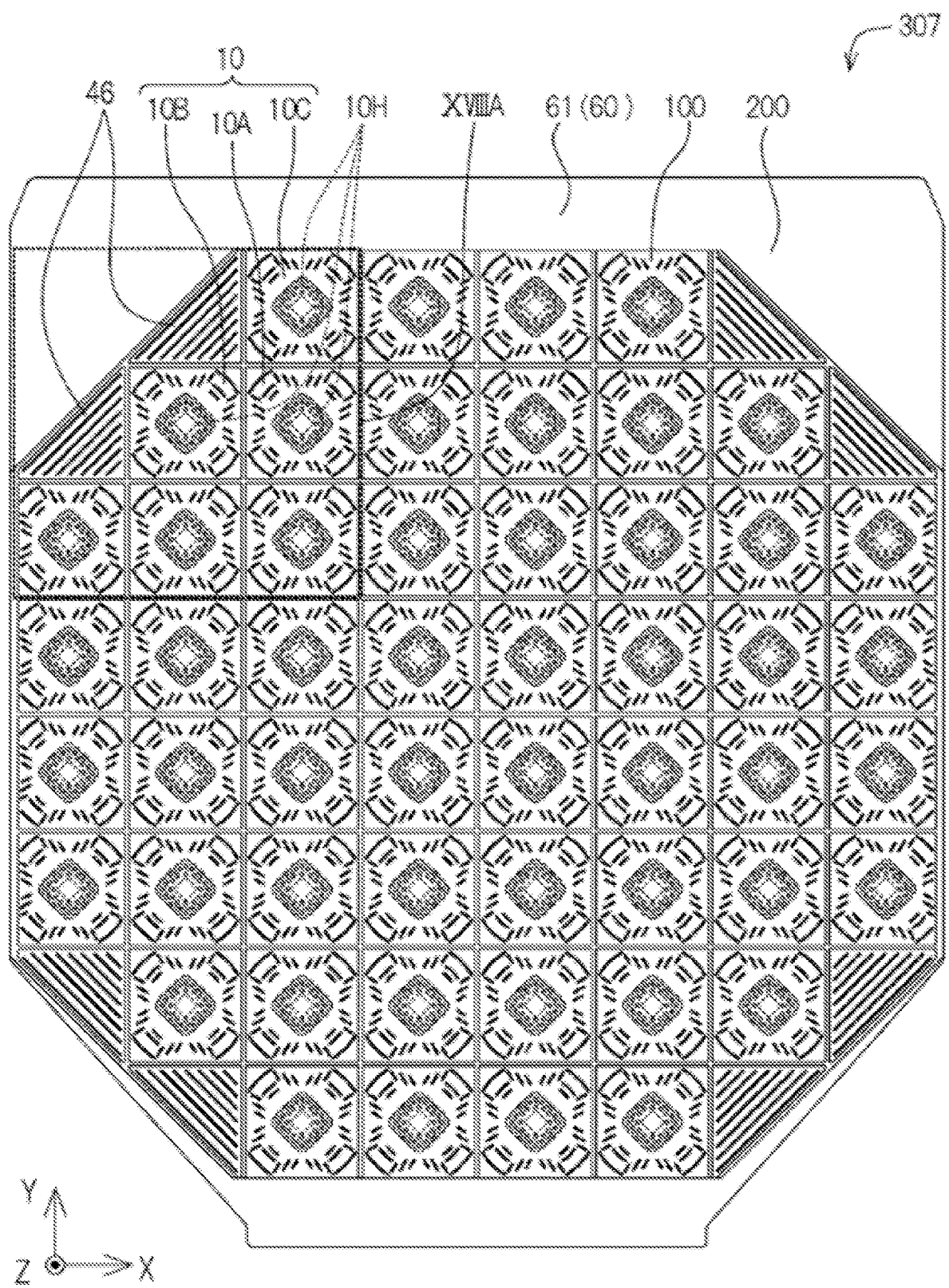
FIG. 17 is a schematic plan view of a modification of the exemplary planar light source according to the exemplary embodiment.
Figure 18A:
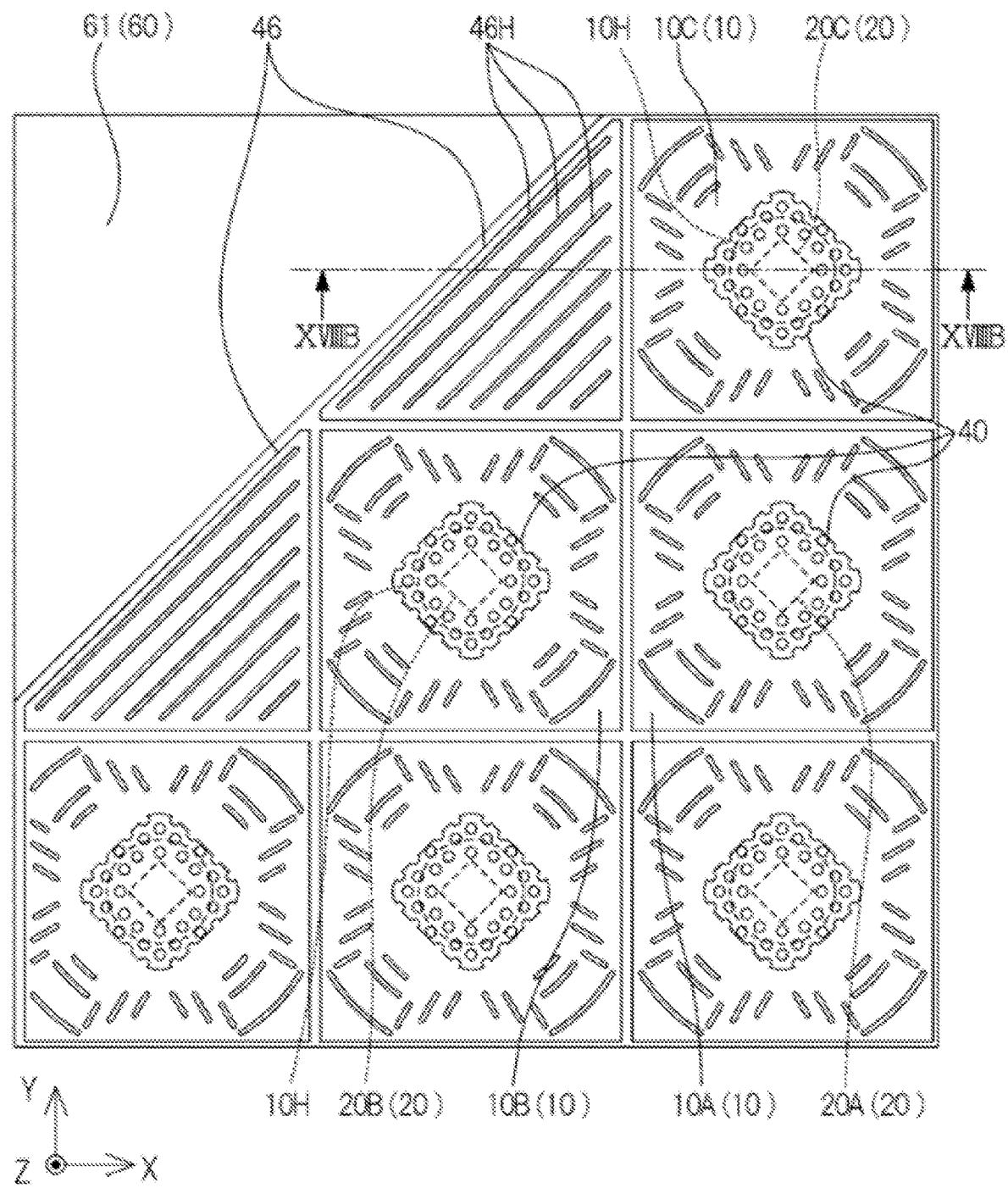
FIG. 18A is a schematic enlarged view of the exemplary planar light source in an XVIIIA portion of FIG. 17.

Modifications of the planar light source will be described with reference to FIG. 17 and FIGS. 18A to 18E. As illustrated in FIGS. 17 and 18A, the light guide member 10 of the light-emitting module 100 includes the plurality of light guide members 10 each including the first light guide portion 10A, the second light guide portion 10B, and the third light guide portion 10C. In the first direction (X direction), the first light guide portion 10A and the second light guide portion 10B are adjacent to each other. In the second direction (Y direction) orthogonal to the first direction (X direction), the first light guide portion 10A and the third light guide portion 10C are adjacent to each other. As illustrated in FIG. 17, the light-emitting module 100 of a planar light source 307 includes a third light-transmissive member 46. The third light-transmissive member 46 is adjacent to the second light guide portion 10B and the third light guide portion 10C. In the first direction (X direction), the third light-transmissive member 46 and the third light guide portion 10C are adjacent to each other. In the second direction (Y direction), the third light-transmissive member 46 and the second light guide portion 10B are adjacent to each other. The light-emitting module 100 includes the third light-transmissive member 46, which makes it easy to adjust luminance in the vicinity of the second light guide portion 10B and/or the third light guide portion 10C. Light from the second light source 20B disposed in the first through hole 10H of the second light guide portion 10B and/or from the third light source 20C disposed in the first through hole 10H of the third light guide portion 10C is incident on the third light-transmissive member 46. This makes it easy to adjust luminance in a region directly above the third light-transmissive member 46 located in the vicinity of the second light guide portion 10B and the third light guide portion 10C. Note that in the present specification, it is only required to be partial overlapping in one direction to be adjacent. For example, the fact that the first light guide portion 10A and the second light guide portion 10B are adjacent to each other in the first direction (X direction) means that at least a part of the first light guide portion 10A has a portion overlapping the second light guide portion 10B in the first direction (X direction).

Figure 18B:
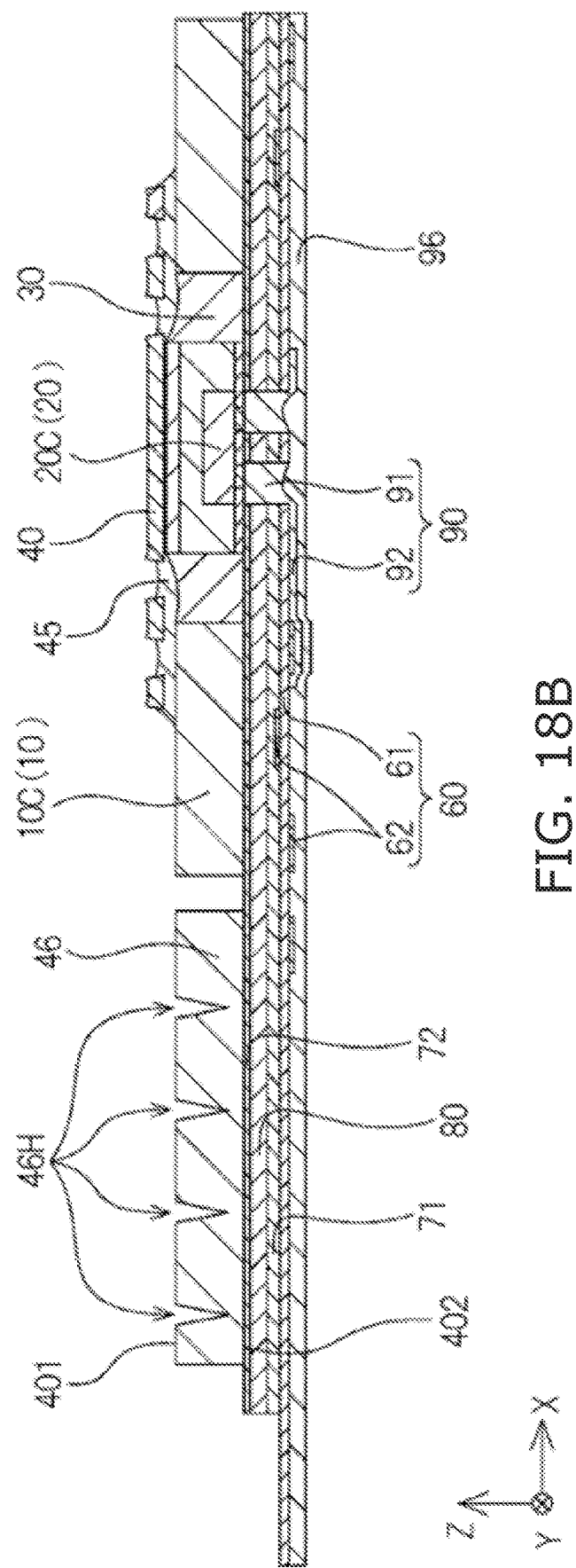
FIG. 18B is a schematic cross-sectional view taken along line XVIIIB-XVIIIB of FIG. 18A.

As illustrated in FIG. 18B, the third light-transmissive member 46 preferably includes a hole portion 46H that opens on an upper surface 401 side of the third light-transmissive member 46. When the third light-transmissive member 46 includes the hole portion 46H, a surface area of the third light-transmissive member 46 can be increased. This makes it easy to take out light incident on the third light-transmissive member 46 to the outside of the third light-transmissive member 46. For example, when the third light-transmissive member 46 includes the hole portion 46H, light traveling in the lateral direction from the light source unit 20 easily hits the surface of the third light-transmissive member 46 defining the hole portion 46H. Therefore, it is possible to increase the amount of light taken out from the surface of the third light-transmissive member 46 defining the hole portion 46H to the outside of the light guide member 10. This makes it possible to improve luminance in a region directly above the third light-transmissive member 46. In the present embodiment, the hole portion 46H of the third light-transmissive member 46 is a recessed portion that opens only on the upper surface 401 side. Note that the hole portion 46H of the third light-transmissive member 46 may be a through hole penetrating from the upper surface 401 to a lower surface 402, or may be a recessed portion that opens only on the lower surface 402 side. The third light-transmissive member 46 preferably includes a plurality of hole portions 46H. By doing so, it becomes easy to increase the surface area of the third light-transmissive member 46. This makes it easy to take out light incident on the third light-transmissive member 46 to the outside of the third light-transmissive member 46.

As illustrated in FIG. 18B, preferably, at least a part of the hole portion 46H of the third light-transmissive member 46 overlaps the light source unit 20 in the lateral direction. By doing so, light from the light source unit 20 incident on the third light-transmissive member 46 is easily taken out to the outside of the third light-transmissive member 46 by the hole portion 46H. This makes it possible to improve luminance in a region directly above the third light-transmissive member 46.

As illustrated in FIG. 18A, the hole portion 46H of the third light-transmissive member 46 preferably includes a portion extending in a direction intersecting the first direction (X direction) and the second direction (Y direction) in a plan view. By doing so, light traveling from the second light source 20B in the second direction (Y direction) and light traveling in the first direction (X direction) from the third light source 20C can be easily taken out to the outside of the third light-transmissive member 46 by the hole portion 46H of the third light-transmissive member 46. This makes it possible to improve luminance in a region directly above the third light-transmissive member 46. In a plan view, an angle formed by the direction in which the hole portion 46H of the third light-transmissive member 46 extends and the first direction (X direction) is preferably in a range from 30° to 60°. By doing so, light traveling from the second light source 20B in the second direction (Y direction) and light traveling in the first direction (X direction) from the third light source 20C can be easily taken out to the outside of the third light-transmissive member 46 by the hole portion 46H of the third light-transmissive member 46. Note that in the present specification, in a plan view, the angle formed by the direction in which the hole portion 46H of the third light-transmissive member 46 extends and the first direction (X direction) refers to the angle of 90° or less that is formed by the direction in which the hole portion 46H of the third light-transmissive member 46 extends and the first direction.

Figure 18C:
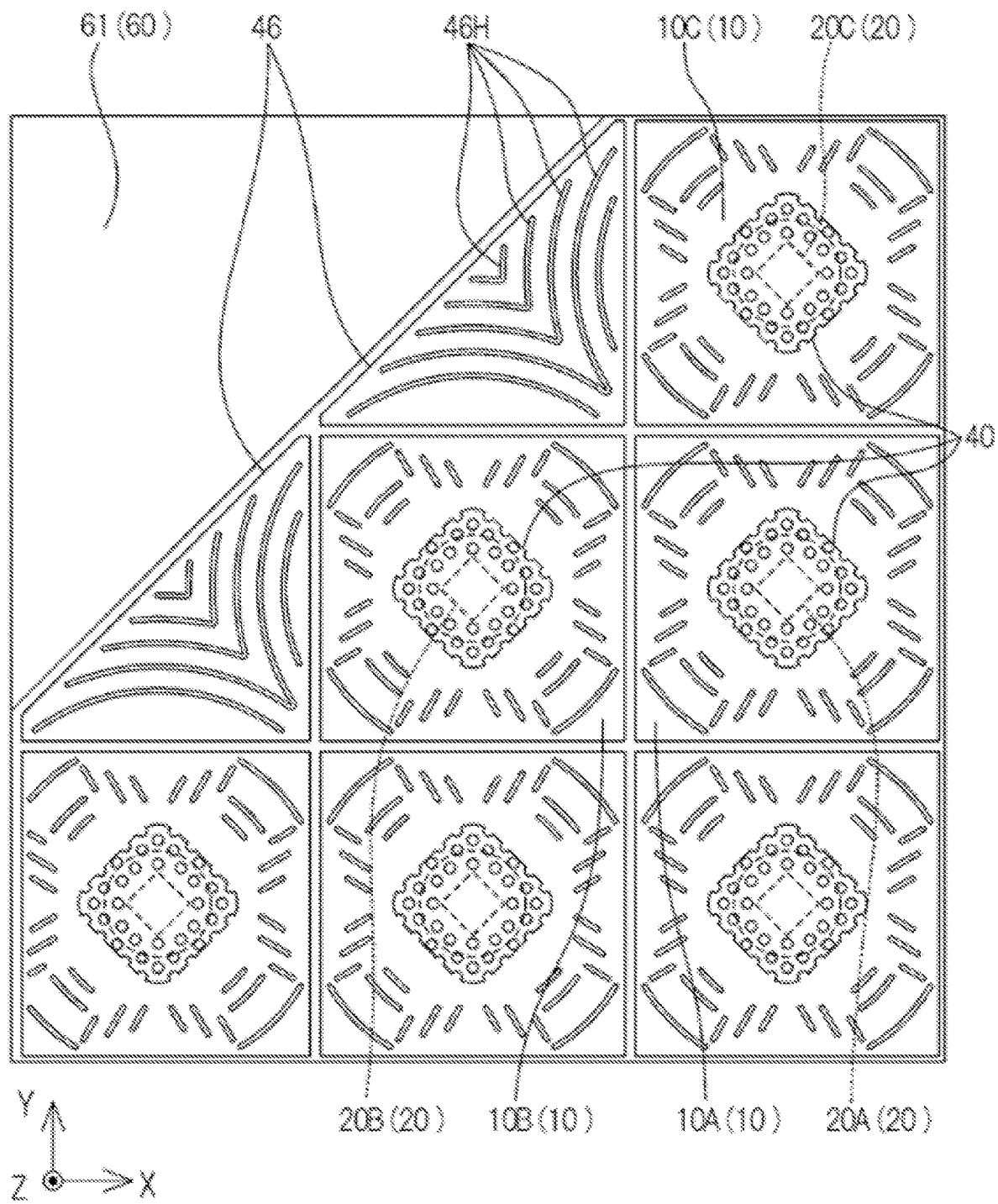
FIG. 18C is a schematic enlarged view of a modification of the exemplary planar light source according to the exemplary embodiment.
Figure 18D:
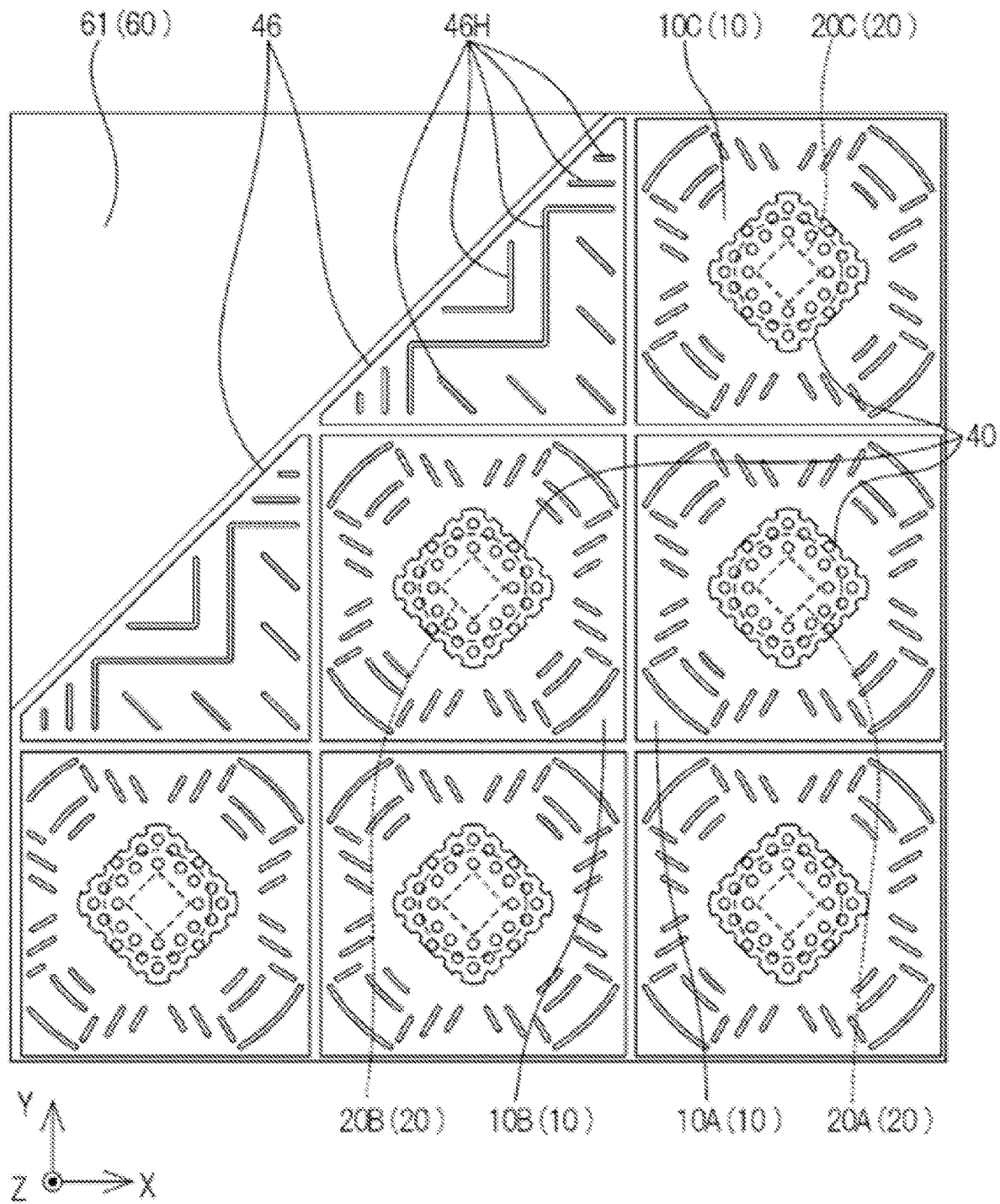
FIG. 18D is a schematic enlarged view of a modification of the exemplary planar light source according to the exemplary embodiment.
Figure 18E:
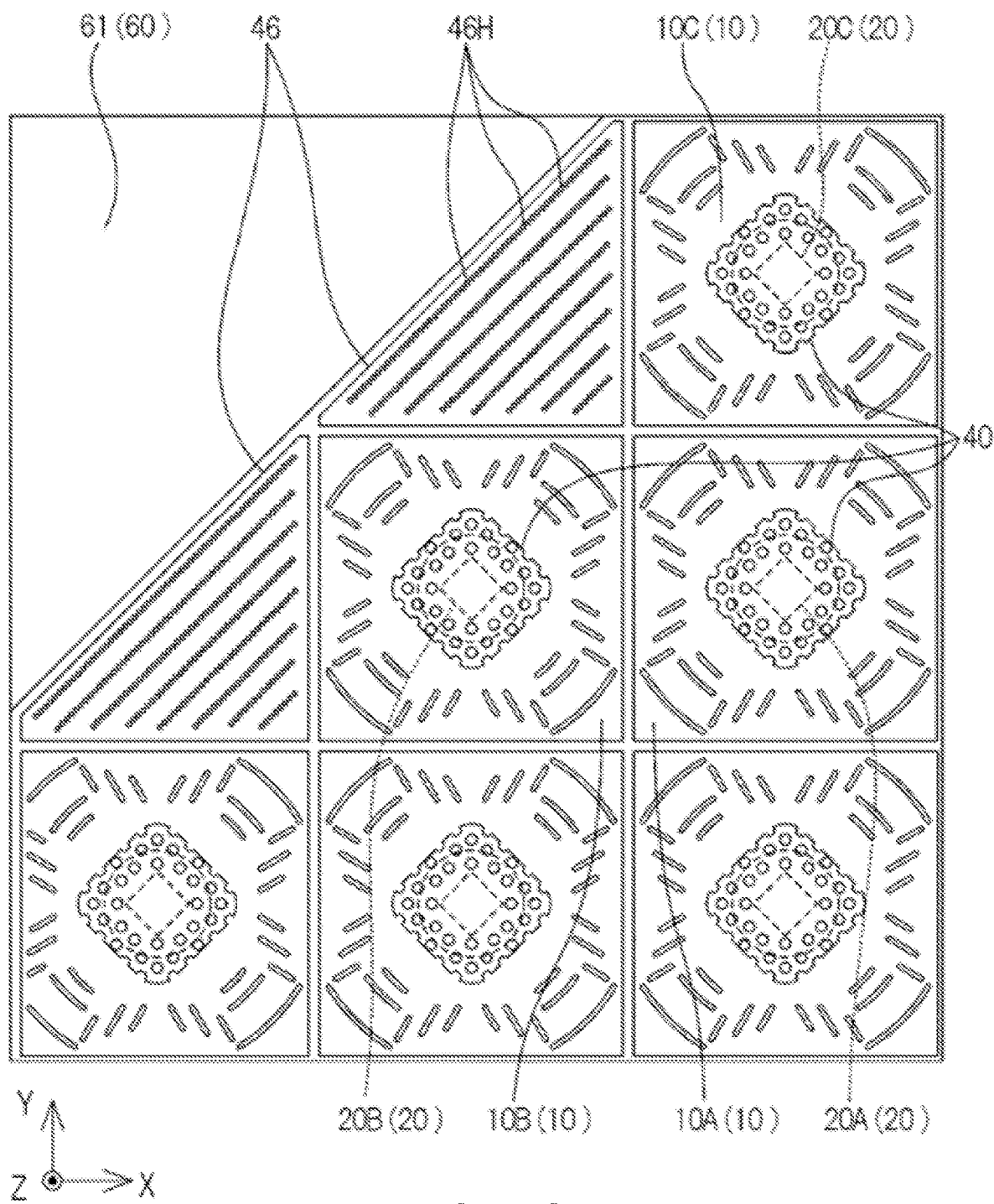
FIG. 18E is a schematic enlarged view of a modification of the exemplary planar light source according to the exemplary embodiment.

A shape of the hole portion 46H of the third light-transmissive member 46 in a plan view is not particularly limited. As illustrated in FIG. 18A, the hole portion 46H of the third light-transmissive member 46 in the present embodiment has a shape extending in one direction. As illustrated in FIG. 18C, the shape of the hole portion 46H of the third light-transmissive member 46 in a plan view may have a curved portion. In a plan view, the shape of the hole portion 46H of the third light-transmissive member 46 may be a V-shape or an L-shape extending in two directions. A portion connecting portions extending in two directions may be rounded. As illustrated in FIG. 18D, the hole portion 46H of the third light-transmissive member 46 may include a portion extending in the first direction (X direction) and a portion extending in the second direction (Y direction). As illustrated in FIG. 18E, the shape of the hole portion 46H of the third light-transmissive member 46 in a plan view may be a circle. In a plan view, the shape of the hole portion 46H of the third light-transmissive member 46 may be an ellipse, or a polygon such as a triangle, a quadrangle, a hexagon, or an octagon. As illustrated in FIG. 18E, in a plan view, the plurality of hole portions 46H of the third light-transmissive member 46 may be disposed side by side in a direction in which the hole portion 46H of the third light-transmissive member 46 illustrated in FIG. 18A extends. For example, in a plan view, the plurality of hole portions 46H of the third light-transmissive member 46 may be arranged side by side in a direction intersecting the first direction (X direction) and the second direction (Y direction). In a plan view, the plurality of hole portions 46H of the third light-transmissive member 46 may be disposed side by side in a direction in which the hole portion 46H of the third light-transmissive member 46 illustrated in FIG. 18C or FIG. 18D extends.

As the material of the third light-transmissive member 46, the same material as that of the light guide member 10 can be used. The maximum thickness of the third light-transmissive member 46 in the third direction (Z direction) is preferably in a range from 0.8 times to 1.2 times the maximum thickness of the light guide member 10 in the third direction (Z direction). The maximum thickness of the third light-transmissive member 46 in the third direction (Z direction) is 0.8 times or more the maximum thickness of the light guide member 10 in the third direction (Z direction), which makes it easy to adjust luminance in the light-emitting module by the third light-transmissive member 46. Further, the thickness of the third light-transmissive member 46 is thick, which makes it easy to improve the strength of the light-emitting module. The maximum thickness of the third light-transmissive member 46 in the third direction (Z direction) is 1.2 times or less the maximum thickness of the light guide member 10 in the third direction (Z direction), which makes it easy to downsize the light-emitting module in the third direction (Z direction).

The present specification includes the following embodiments.

Clause 1. A light-emitting module including:
a light guide member including a first surface, a second surface on an opposite side of the first surface, and a first through hole penetrating from the first surface to the second surface;
a light source unit disposed in the first through hole of the light guide member;
a first light-transmissive member disposed in the first through hole of the light guide member and covering the light source unit; and
a reflective member disposed above the light source unit and disposed above the first light-transmissive member,
wherein in a plan view, an outer edge of the reflective member is located outside an outer edge of the light source unit, and
the reflective member includes a resin member and a reflector having a refractive index lower than a refractive index of the first resin member.

Clause 2. The light-emitting module according to clause 1, wherein the reflector is a gas.

Clause 3. The light-emitting module according to clause 1 or 2, wherein the resin member is a polyethylene terephthalate resin, an olefin resin, an acrylic resin, a silicone resin, a urethane resin, or an epoxy resin.

Clause 4. The light-emitting module according to any one of clauses 1 to 3, wherein the reflective member includes a plurality of second through holes.

Clause 5. The light-emitting module according to clause 4, wherein in the plan view, all of the plurality of second through holes are located apart from the light source unit.

Clause 6. The light-emitting module according to clause 4 or 5, further including:
a second light-transmissive member located between the first light-transmissive member and the reflective member,
wherein the second light-transmissive member is in contact with at least a part of a side surface of the reflective member that defines the second through hole.

Clause 7. The light-emitting module according to clause 6, wherein the second light-transmissive member is in contact with at least a part of an upper surface of the reflective member.

Clause 8. The light-emitting module according to clause 7, wherein the plurality of second through holes include a third through hole and a fourth through hole being adjacent to each other, and
in a cross-sectional view, a side surface of the reflective member that defines the third through hole, an upper surface of the reflective member located between the third through hole and the fourth through hole, and a side surface of the reflective member that defines the fourth through hole are continuously covered.

Clause 9. The light-emitting module according to any one of clauses 1 to 8, wherein, in the plan view, the outer edge of the reflective member is located inside an outer edge of the first through hole.

Clause 10. The light-emitting module according to any one of clauses 1 to 8, wherein, in the plan view, the outer edge of the reflective member is located outside an outer edge of the first through hole.

Clause 11. The light emitting module according to any one of clauses 1 to 10, further comprising:
a plurality of light guide members each including a first light guide portion, a second light guide portion, and a third light guide portion; and
a third light-transmissive member adjacent to the second light guide portion and the third light guide portion,
wherein the first light guide portion and the second light guide portion are adjacent to each other in a first direction, the first light guide portion and the third light guide portion are adjacent to each other in a second direction orthogonal to the first direction, the third light-transmissive member and the third light guide portion are adjacent to each other in the first direction, and the third light-transmissive member and the second light guide portion are adjacent to each other in the second direction.

Clause 12. The light emitting module according to clause 11, wherein the third light-transmissive member includes a hole portion that opens on an upper surface side of the third light-transmissive member.

Clause 13. The light emitting module according to clause 12, wherein in a plan view, the hole portion includes a portion extending in a direction intersecting the first direction and the second direction.

Clause 14. A planar light source comprising:
the light-emitting module according to any one of clauses 1 to 13; and
a support member on which the light-emitting module is disposed.

The embodiments of the present invention have been described above with reference to specific examples. However, the present invention is not limited to these specific examples. All aspects that can be practiced by a person skilled in the art modifying the design as appropriate based on the above-described embodiments of the present invention are also included in the scope of the present invention, as long as they encompass the spirit of the present invention. In addition, in the spirit of the present invention, a person skilled in the art can conceive of various modified examples and alterations, and those modified examples and alterations will also fall within the scope of the present invention.

What is claimed is:

1. A light-emitting module comprising:
a light guide member including a first surface, a second surface on an opposite side of the first surface, and a first through hole penetrating from the first surface to the second surface;
a light source unit disposed in the first through hole of the light guide member;
a first light-transmissive member disposed in the first through hole of the light guide member and covering the light source unit; and
a reflective member disposed above the light source unit and disposed above the first light-transmissive member,
wherein in a plan view, an outer edge of the reflective member is located outside an outer edge of the light source unit,
wherein the reflective member includes a resin member and a reflector having a refractive index lower than a refractive index of the resin member, and
wherein the reflective member includes a plurality of second through holes.

2. The light-emitting module according to claim 1, wherein the reflector is a gas.

3. The light-emitting module according to claim 1, wherein the resin member is a polyethylene terephthalate resin, an olefin resin, an acrylic resin, a silicone resin, an urethane resin, or an epoxy resin.

4. The light-emitting module according to claim 1, wherein in the plan view, all of the plurality of second through holes are located apart from the light source unit.

5. The light-emitting module according to claim 1, further comprising:
a second light-transmissive member located between the first light-transmissive member and the reflective member,
wherein the second light-transmissive member is in contact with at least a part of a side surface of the reflective member that defines the second through hole.

6. The light-emitting module according to claim 5, wherein the second light-transmissive member is in contact with at least a part of an upper surface of the reflective member.

7. The light-emitting module according to claim 6, wherein the plurality of second through holes include a third through hole and a fourth through hole being adjacent to each other, and
in a cross-sectional view, a side surface of the reflective member that defines the third through hole, an upper surface of the reflective member located between the third through hole and the fourth through hole, and a side surface of the reflective member that defines the fourth through hole are continuously covered.

8. The light-emitting module according to claim 1, wherein, in the plan view, the outer edge of the reflective member is located inside an outer edge of the first through hole.

9. The light-emitting module according to claim 1, wherein, in the plan view, the outer edge of the reflective member is located outside an outer edge of the first through hole.

10. A light-emitting module comprising:
a light guide member including a first surface, a second surface on an opposite side of the first surface, and a first through hole penetrating from the first surface to the second surface;
a light source unit disposed in the first through hole of the light guide member;
a first light-transmissive member disposed in the first through hole of the light guide member and covering the light source unit;
a reflective member disposed above the light source unit and disposed above the first light-transmissive member; and a plurality of light guide members each including a first light guide portion, a second light guide portion, and a third light guide portion; and a third light-transmissive member adjacent to the second light guide portion and the third light guide portion, wherein in a plan view, an outer edge of the reflective member is located outside an outer edge of the light source unit, wherein the reflective member includes a resin member and a reflector having a refractive index lower than a refractive index of the resin member, and wherein the first light guide portion and the second light guide portion are adjacent to each other in a first direction, the first light guide portion and the third light guide portion are adjacent to each other in a second direction orthogonal to the first direction, the third light-transmissive member and the third light guide portion are adjacent to each other in the first direction, and the third light-transmissive member and the second light guide portion are adjacent to each other in the second direction.

11. The light-emitting module according to claim 10, wherein the third light-transmissive member includes a hole portion that opens on an upper surface side of the third light-transmissive member.

12. The light-emitting module according to claim 11, wherein in a plan view, the hole portion includes a portion extending in a direction intersecting the first direction and the second direction.

13. A planar light source comprising:
the light-emitting module according to claim 1; and
a support member on which the light-emitting module is disposed.

14. The light-emitting module according to claim 10, wherein the reflective member includes a plurality of second through holes.

15. The light-emitting module according to claim 14, wherein in the plan view, all of the plurality of second through holes are located apart from the light source unit.

16. The light-emitting module according to claim 14, further comprising:
a second light-transmissive member located between the first light-transmissive member and the reflective member,
wherein the second light-transmissive member is in contact with at least a part of a side surface of the reflective member that defines the second through hole.

17. The light-emitting module according to claim 16, wherein the second light-transmissive member is in contact with at least a part of an upper surface of the reflective member.

18. The light-emitting module according to claim 17, wherein the plurality of second through holes include a third through hole and a fourth through hole being adjacent to each other, and
wherein in a cross-sectional view, a side surface of the reflective member that defines the third through hole, an upper surface of the reflective member located between the third through hole and the fourth through hole, and a side surface of the reflective member that defines the fourth through hole are continuously covered.

19. The light-emitting module according to claim 10, wherein, in the plan view, the outer edge of the reflective member is located inside an outer edge of the first through hole.

20. The light-emitting module according to claim 10, wherein, in the plan view, the outer edge of the reflective member is located outside an outer edge of the first through hole.

* * * * *